United States Patent
Oster et al.

(10) Patent No.: US 10,382,192 B2
(45) Date of Patent: Aug. 13, 2019

(54) SYSTEM AND METHOD FOR DYNAMICALLY CALIBRATING ONE OR MORE RADIOFREQUENCY CHANNELS OF A SATELLITE PAYLOAD

(71) Applicant: THALES, Courbevoie (FR)

(72) Inventors: Yann Nicolas Pierre Oster, Toulouse (FR); Aubin Michel Lecointre, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/447,022

(22) Filed: Mar. 1, 2017

(65) Prior Publication Data

US 2017/0288853 A1 Oct. 5, 2017

(30) Foreign Application Priority Data

Apr. 4, 2016 (FR) ...................................... 16 00565

(51) Int. Cl.
*H04L 7/06* (2006.01)
*H04L 5/00* (2006.01)
*H04B 7/185* (2006.01)

(52) U.S. Cl.
CPC .............. *H04L 7/06* (2013.01); *H04B 7/185* (2013.01); *H04B 7/18515* (2013.01); *H04B 7/18519* (2013.01); *H04L 5/0048* (2013.01)

(58) Field of Classification Search
CPC .... H04B 17/21; H04B 17/11; H04B 17/0085; H04B 17/14
See application file for complete search history.

(56) References Cited

U.S. PATENT DOCUMENTS

| 2002/0042256 A1* | 4/2002 | Baldwin | H03D 3/008 455/232.1 |
| 2004/0106380 A1* | 6/2004 | Vassiliou | H04B 17/14 455/73 |
| 2005/0140546 A1* | 6/2005 | Park | G01S 7/4008 342/368 |
| 2005/0152487 A1* | 7/2005 | Reichard | H04L 25/03133 375/350 |
| 2005/0219118 A1* | 10/2005 | Kubo | H01Q 3/267 342/174 |
| 2006/0164298 A1* | 7/2006 | Azuma | H04B 7/08 342/368 |

(Continued)

OTHER PUBLICATIONS

Aubin Lecointre, "Payload On-Board self calibration techniques," ESA's ARTES Programmes, Feb. 17, 2014, XP055329026.

*Primary Examiner* — Aristocratis Fotakis
(74) *Attorney, Agent, or Firm* — Baker & Hostetler LLP

(57) ABSTRACT

A system for dynamic calibration of a first radiofrequency chain to be calibrated comprises: an injection device for injecting a calibration signal whose waveform is predetermined, connected upstream of the radiofrequency chain to be calibrated, and a compensation device for compensating the amplitude-wise and phase-wise disparities caused by the first chain to be calibrated including a controlled compensation filter. The automatic calibration system comprises a device for temporal erasure of the calibration signal injected with the aid of an analog or digital subtracter, the subtracter being connected downstream of the first radiofrequency chain to be calibrated.

14 Claims, 9 Drawing Sheets

(56) References Cited

U.S. PATENT DOCUMENTS

| | | | |
|---|---|---|---|
| 2006/0234694 A1* | 10/2006 | Kawasaki | H01Q 3/267 455/423 |
| 2010/0164782 A1* | 7/2010 | Saha | H04B 7/18515 342/174 |
| 2010/0254299 A1* | 10/2010 | Kenington | H01Q 3/267 370/315 |
| 2012/0020392 A1* | 1/2012 | O'Keeffe | H04B 7/10 375/221 |
| 2012/0027066 A1* | 2/2012 | O'Keeffe | H01Q 1/246 375/224 |
| 2013/0208839 A1* | 8/2013 | Isberg | H03J 7/065 375/371 |
| 2014/0270002 A1* | 9/2014 | Schubert | H04L 1/0045 375/320 |
| 2016/0112887 A1* | 4/2016 | Dark | H04B 17/309 455/67.11 |
| 2016/0218428 A1* | 7/2016 | Jung | H01Q 3/267 |

* cited by examiner

564

AN INJECTION DEVICE INJECTS A SECOND CALIBRATION SIGNAL WHOSE WAVEFORM IS PREDETERMINED UPSTREAM OF THE FIRST RADIOFREQUENCY CHAIN TO BE CALIBRATED, THE SECOND CALIBRATION SIGNAL BEING INJECTED DIRECTLY IN DIGITAL FORM OR INDIRECTLY IN ANALOGUE FORM THROUGH A SECOND ANALOGUE INJECTION CHAIN ON THE BASIS OF A REFERENCE CALIBRATION SIGNAL.

568

A TEMPORAL ERASURE DEVICE TEMPORALLY ERASES THE CALIBRATION SIGNAL INJECTED WITH THE AID OF AN ANALOGUE OR DIGITAL SUBTRACTER, CONNECTED DOWNSTREAM OF THE FIRST CHAIN TO BE CALIBRATED.

566

A COMPENSATION DEVICE COMPENSATES, ON THE USEFUL FREQUENCY BAND OF THE FIRST CHAIN, AMPLITUDE-WISE AND PHASE-WISE DISPARITIES CAUSED BY THE FIRST CHAIN TO BE CALIBRATED, WITH THE AID OF A COMPENSATION FILTER, DISPOSED UPSTREAM OR DOWNSTREAM OF THE FIRST

SYSTEM AND METHOD FOR DYNAMICALLY CALIBRATING ONE OR MORE RADIOFREQUENCY CHANNELS OF A SATELLITE PAYLOAD

CROSS-REFERENCE TO RELATED APPLICATIONS

This application claims priority to foreign French patent application No. FR 1600565, filed on Apr. 4, 2016, the disclosure of which is incorporated by reference in its entirety.

FILED OF THE INVENTION

The present invention relates to a system and a method for dynamic calibration of one or more RF radiofrequency transmission chains of a satellite payload for which the said dynamic calibration of the radiofrequency chain is implemented without interrupting the transmission of the useful signal passing through the RF chain, and for which the waveform of the compensated useful signal, obtained as output from the RF chain during and after calibration, is scarcely degraded.

BACKGROUND

Generally, the performance of a radioelectric circuit forming at least one RF radiofrequency chain of analogue functions placed in series according to various combinations, such as for example an RF amplification, a frequency transposition, a filtering, are affected by unforeseeable and variable discrepancies resulting for example from the manufacture, from the sensitivity to the temperature of the environment, from the ageing of the components and their exposure to ionizing radiations.

In a particular manner, the performance of the circuits of satellite-borne telecommunications payloads undergo unforeseeable effects such as these.

Thus, for a conventional telecommunications payload comprising a small number of RF radiofrequency chains and antennas with a single source per beam SFPB ("Single Feed Per Beam"), a requirement is typically stipulated to estimate and to compensate the spectral response of the chains, so as to equalize the gain and the group propagation time on the useful band.

Dealing as one is with a telecommunications payload implementing an active antenna and a large number of associated RF radiofrequency chains or pathways, the requirement is stipulated not only of equalization for each pathway of the spectral response on the useful band, but also of equalization of the dispersions in phase and amplitude between the pathways on the useful band. Indeed, the radioelectric performance of active antennas is particularly sensitive to the phase shifts between pathways, and the requirement fixed to the tolerance of such phase shifts is particularly severe, in particular for embedding an anti-jamming function.

In order to control the dispersions in amplitude and phase per pathway or between pathways, a first family of conventional so-called static solutions has been implemented and is still used nowadays, in particular in the space sector.

A first static solution of the said first family consists in over-constraining the technical performance specification requirements of each component or item of equipment of the radiofrequency chain, so that the sum of the dispersions in gain and phase on the useful band that are caused by the whole set of components of the radiofrequency chain, remains compatible with the desired performance level, for the lifetime envisaged.

This first conventional technique which over-constrains the design, the manufacture, the provisioning, and the adjustment in the phase of integration of the components of the chain or chains, corresponds to a conservative approach. The effect of this approach is to significantly increase the manufacturing costs. Moreover, the residual dispersions not being compensated dynamically, the dispersions remain non-negligible and certain functions such as anti-jamming cannot always be carried out.

A second static solution of the said first family consists in characterizing the behaviour of the elements or equipment, in terms of sensitivity to temperature and/or to supply voltage, and then in embedding a static compensation function, using the measurement of temperature and/or supply voltage, and adjusted in the AIT (Assembly, Integration and Test) phase, specifically for each instance. This type of solution allows static correction but does not allow a capacity for adaptation to the real discrepancies which may worsen, in particular on account of ageing and of the effect of the radiations experienced by the components of the radiofrequency chain in orbit.

In order to remedy the drawbacks exhibited by the first and second static solutions of the first family of solutions, a second family of so-called dynamic solutions is described in the article by A. Lecointre et al., entitled "On-Board Self Calibration Techniques" and published at the ESA Workshop of 17-19 Apr. 2012: "ESA workshop on advanced flexible telecom payloads". This document reviews the dynamic calibration techniques used hitherto or under development, and evaluates the effect of the calibration signal on the nominal service or the communication signal as a function of the calibration technique used.

Each dynamic solution, described in the article by A. Lecointre et al., consists in estimating the discrepancies in amplitude and/or in phase on the radiofrequency chain or chains, by using a known calibration signal, injected at input and extracted at output of the radiofrequency chain. The deformation of the calibration signal at the output of the radiofrequency chain makes it possible to estimate the real-time spectral response, and to compensate the defects of the response with a feedback loop. This type of dynamic, looped solution makes it possible to adapt advantageously to the defects, independently of their origin and of a non-predictable variability of their occurrence, such as a defect caused by ageing and/or radiations.

In order to be able to inject and extract the measurement signal serving for calibration, a first dynamic solution of the said second family consists in suspending the useful telecommunication service for a period of time with the drawback of degrading the quality of the service.

A second dynamic solution of the said second family consists in spreading the spectrum of the calibration signal so as to be able to superimpose it on the useful traffic signal without overly disturbing the said useful signal, and thus avoid interruption of the telecommunication service. However, in this case the calibration measurement is affected by a low ratio of the level of the calibration signal measured to the noise and interference level $SNIR_{cal}$ ("calibration Signal to Noise and Interference Ratio") and the spreading of the measured point in terms of frequency, the estimation of the defects corresponding to an average of the defects over the spread band.

A third dynamic solution of the said second family consists in injecting the calibration signal on frequencies that are not used by the communication services on guard bands with the drawback of poor granularity of the frequencies used for estimating the dispersion in amplitudes and/or in phases on the band of the chain to be calibrated.

A first technical problem is to improve the quality of correction or compensation of the response of a radiofrequency chain on the useful band of the radiofrequency chain, which is obtained by a correction or compensation carried out by a method and a system for dynamic calibration using the techniques described hereinabove.

A second technical problem is to limit the interference level experienced by the calibration signal and the source of which is the useful communication signal when the compensation method is implemented without interruption of the useful communication service.

A third technical problem is to minimize the distortion caused by the calibration signal on the useful communication signal at the output of the chain under calibration when calibration is active.

SUMMARY OF THE INVENTION

For this purpose, the subject of the invention is a system for dynamic calibration of a radiofrequency circuit of a satellite payload, the RF radiofrequency circuit comprising a first radiofrequency chain to be calibrated for amplification and for filtering with or without transposition to a predetermined transposition frequency of a first input signal made up of the temporal sum of a second calibration signal and of a third useful input signal, the first radiofrequency chain to be calibrated on a useful chain band lying between upstream a first upstream port for receiving the first input signal and downstream a first downstream port for providing a first output signal, the first output signal being the frequential and temporal response of the radiofrequency chain to be calibrated to the first input signal; and the dynamic calibration system comprising:

a device for injecting the second calibration signal whose waveform is predetermined upstream of the first radiofrequency chain to be calibrated, the second calibration signal being injected directly in digital form or indirectly in analogue form through a second analogue injection chain on the basis of a reference calibration signal, and the band of the second calibration signal being included in useful band of the first chain to be calibrated; and a device for compensating the frequential and temporal response of the first radiofrequency chain to be calibrated, comprising a filter for compensation on the useful frequency band of the first chain to be calibrated, the compensation filter being disposed upstream or downstream of the first radiofrequency chain to be calibrated and the compensation being carried out on the basis of measurements of a fourth signal observed downstream of the first radiofrequency chain to be calibrated and of the compensation filter, or directly downstream of the first chain to be calibrated; the dynamic calibration system being characterized in that it comprises:

a device for temporal erasure of the second injected calibration signal having an analogue or digital subtracter, connected downstream of the first radiofrequency chain to be calibrated.

According to particular embodiments, the dynamic calibration system comprises one or more of the following characteristics:

the analogue or digital subtracter is connected downstream of the first radiofrequency chain to be calibrated and downstream of the compensation filter, or the digital subtracter is connected between upstream the first radiofrequency chain to be calibrated and downstream the compensation filter;

the temporal erasure device also comprises a third digital or analogue chain for providing a replica of the reference calibration signal to be subtracted, adapted in terms of transposition frequency compatible with the output frequency of the radiofrequency chain to be calibrated, of delay compatible with the propagation times of the signal through the injection device and the first radiofrequency chain to be calibrated, or through the injection device, the first radiofrequency chain to be calibrated and the compensation filter; and the temporal erasure device is configured to subtract in a coherent manner the adapted replica of the reference calibration signal from the output signal of the first radiofrequency chain to be calibrated;

the dynamic calibration system furthermore comprises a first generator of one or more local oscillator OL signals identical to within a phase shift and synchronized to a first reference clock; and when the first radiofrequency chain to be calibrated comprises one or more frequency transposition circuits; and/or when the second injection chain is analogue and comprises one or more frequency transposition circuits; and/or when the third chain for providing the adapted replica is analogue and comprises one or more frequency transposition circuits, the first transposition circuit or circuits, and/or the second transposition circuit or circuits, and/or the third transposition circuit or circuits are configured to use the same local oscillator signal OL to within a phase shift and to carry out the upward or downward frequency transpositions;

when the injection of the calibration signal is digital, the device for injecting the calibration signal comprises a digital generator of a digital reference calibration signal and a digital summator of the reference calibration signal with a digital traffic signal; and when the injection of the calibration signal is analogue, the device for injecting the calibration signal comprises a digital generator of a digital reference calibration signal, a digital-analogue converter, and a second analogue injection chain including an analogue coupler operating as summator of two analogue signals; and the device for injecting the calibration signal is configured to tailor the power of the second calibration signal dynamically in relation to that of the third useful signal to the highest possible level compatible with an absence of saturation of an analogue-digital or digital-analogue converter of the first radiofrequency chain to be calibrated, disposed respectively at the output or at the input of the said first chain;

the first radiofrequency chain to be calibrated is an analogue chain of a communication receiver comprising a first frequency down-transposition circuit, a first upstream amplification stage disposed upstream of the first transposition circuit, a first downstream amplification stage disposed downstream of the first transposition circuit, and a first output analogue-digital converter, connected at output of the first chain to be calibrated; and the device for injecting the calibration signal comprises, placed in series, a digital generator of a digital reference calibration signal, a digital-analogue converter, and a second analogue injection chain including an analogue coupler operating as summator of two analogue signals; and the injection device is configured to inject one or more calibration signals for a temporal sequence covering the useful frequency band on which the first chain is to be calibrated, and to add the calibration signal or signals to the third useful traffic signal; and the temporal erasure device comprises the digital generator of the digital reference calibration signal shared with the injection device, a digital subtracter, and a third digital chain for providing a replica of the reference calibration signal to be subtracted, adapted in terms of a transposition frequency compatible with the output frequency of the radiofrequency chain to be calibrated and a delay compatible with the propagation times of the signal along the propagation path passing successively through the injection device, the first radiofrequency chain to be calibrated and the compensation filter;

the device for compensating the frequential and temporal response of the first radiofrequency chain to be calibrated comprises a compensation filter and an adaptive or block-wise optimizer of the coefficients of the compensation filter, the compensation filter being disposed directly downstream of the first radiofrequency chain to be calibrated and directly upstream of the digital subtracter of the temporal erasure device, and the adaptive optimizer is configured to determine commands for the coefficients of the compensation filter on the basis of measurements of a fourth observed signal which are captured directly downstream of the digital subtracter, and on the basis of the reference calibration signal arising from the reference generator;

the first radiofrequency chain to be calibrated is an analogue chain of a communication receiver comprising a first frequency down-transposition circuit, a first upstream amplification stage disposed upstream of the first transposition circuit, a first downstream amplification stage disposed downstream of the first transposition circuit, and a first output analogue-digital converter, connected at output of the first chain to be calibrated; and the device for injecting the calibration signal comprises, placed in series, the digital generator of a digital reference calibration signal, the digital-analogue converter, and a second analogue injection chain including an analogue coupler operating as summator of two analogue signals; and the injection device is configured to inject one or more calibration signals for a temporal sequence covering the useful frequency band on which the first chain is calibrated, and to add the calibration signal or signals to the third useful traffic signal; and the temporal erasure device comprises the digital generator of the digital reference calibration signals of the temporal sequence shared with the injection device, the digital subtracter, and a third digital chain for providing the replicas of the reference calibration signals of the sequence to be subtracted, adapted in terms of a transposition frequency compatible with the output frequency of the radiofrequency chain to be calibrated, of gains and of delays compatible respectively with the gains and propagation times of the calibration signals along the propagation path passing successively through the injection device and the first radiofrequency chain to be calibrated;

the third digital chain comprises the calibration controller, configured to estimate parameters characteristic of the temporal sequence calibration signals on the basis of the fourth observed current signal, and configured to determine parameters characteristic of replicas adapted to the sequence calibration signals on the basis of the sequence calibration signals generated by the reference calibration signal generator and estimated characteristic parameters; and a digital generator of the replicas adapted to the calibration signals observed and to be subtracted;

the device for compensating the frequential and temporal response of the first radiofrequency chain to be calibrated comprises a compensation filter and a drive circuit for the coefficients of the compensation filter, the compensation filter being connected directly downstream of the digital subtracter, the said subtracter being disposed directly downstream of the first radiofrequency chain to be calibrated; and the drive circuit being configured to determine commands for the coefficients of the compensation filter on the basis of several measurements of a fourth observed signal that are captured directly downstream of the first chain to be calibrated and on the basis of the reference calibration signal arising from the reference generator;

the first radiofrequency chain to be calibrated is an analogue chain of a communication transmitter comprising a first frequency up-transposition circuit, a first upstream amplification stage disposed upstream of the first transposition circuit, a first downstream amplification stage disposed downstream of the first transposition circuit, and a first input digital-analogue converter, connected at output of the compensation filter; the device for injecting the calibration signal comprises, placed in series, a digital generator of a digital reference calibration signal, and a second digital injection chain comprising a digital summator of two digital signals; and the temporal erasure device comprises the digital generator of the digital reference calibration signal shared with the injection device, the analogue subtracter, and a third digital-analogue hybrid chain for providing a replica of the reference calibration signal to be subtracted, adapted in terms of a transposition frequency compatible with the output frequency of the first radiofrequency chain to be calibrated and a delay compatible with the propagation times of the signal along the propagation path passing successively through the injection device, the compensation filter and the first radiofrequency chain to be calibrated;

the third hybrid chain comprises placed in series a third digital sub-chain and a third analogue sub-chain, the third digital sub-chain including in series: a digital circuit for reproducing a digital reference model of a temporal and frequential response of the first radiofrequency chain and of the compensation filter of the first chain when the compensation performed by the compensation filter is optimal, and for correcting the amplitude-wise and phase-wise dispersions caused by the third analogue sub-chain, and a third digital-analogue converter; and the third analogue sub-chain including a third frequency up-transposition circuit, a third upstream amplification stage disposed upstream of the third transposition circuit, a third power amplification downstream stage disposed downstream of the third transposition circuit;

the device for compensating the frequential and temporal response of the first radiofrequency chain to be calibrated comprises a digital compensation filter and an adaptive or block-wise optimizer of the coefficients of the digital compensation filter, the compensation filter being disposed directly upstream of the first radiofrequency chain to be calibrated, and directly downstream of the digital summator, and the adaptive optimizer is configured to determine commands for the coefficients of the compensation filter on the basis of measurements of a fourth observed signal that are captured directly downstream of the analogue subtracter and on the basis of the reference calibration signal arising from the reference generator;

the compensation device furthermore comprises a fourth measurement chain for conveying measurements of the fourth observed signal that are captured directly downstream of the analogue subtracter to the adaptive optimizer, the fourth measurement chain including a fourth frequency down-transposition circuit, a fourth upstream amplification stage disposed upstream of the fourth down-transposition circuit, a fourth downstream amplification stage disposed downstream of the fourth transposition circuit;

the dynamic calibration system furthermore comprises a second generator of one or more sampling clock signals, derived from a common reference clock signal provided by a second reference clock; and when the first radiofrequency chain to be calibrated comprises an analogue-digital converter ADC and/or a digital-analogue converter DAC, and/or when the second injection chain is analogue and comprises a digital-analogue converter DAC; and/or when the third chain for providing the adapted replica is analogue and comprises a digital-analogue converter DAC; and/or when the fourth measurement chain is analogue and comprises an analogue-digital converter ADC; and/or the digital-analogue converter(s) and/or the digital-analogue converter(s) are mutually synchronized through the local clock or the local oscillator, shared and considered to be master, all the analogue-digital ADC and digital-analogue DAC converters are configured to use the sampling clock signal or signals, derived from the common reference clock signal provided by the second reference clock.

The subject of the invention is also a method for dynamic calibration of a radiofrequency circuit of a satellite payload, the radiofrequency circuit comprising a first radiofrequency chain to be calibrated for amplification and for filtering with or without transposition to a predetermined transposition frequency of a first input signal made up of the temporal sum of a second calibration signal and of a third useful input signal, the first radiofrequency chain to be calibrated on a useful chain band lying between upstream a first upstream port for receiving the first input signal and downstream a first downstream port for providing a first output signal, the first output signal being the frequential and temporal response of the first radiofrequency chain to be calibrated to the first input signal; the method of dynamic calibration comprising the steps consisting in that:

in a first step, an injection device injects the second calibration signal whose waveform is predetermined upstream of the first radiofrequency chain to be calibrated, the second calibration signal being injected directly in digital form or indirectly in analogue form through a second analogue injection chain on the basis of a reference calibration signal; and then in a second step, a compensation device compensates, on the useful frequency band of the first chain to be calibrated, amplitude-wise and phase-wise disparities caused by the first chain to be calibrated, with the aid of a compensation filter, disposed upstream or downstream of the first radiofrequency chain to be calibrated, the compensation being carried out on the basis of measurements of a fourth signal observed downstream of the first radiofrequency chain to be calibrated and of the compensation filter, or directly downstream of the first chain to be calibrated; and the method of dynamic calibration being characterized in that it comprises a third step, executed after the first step, in the course of which a temporal erasure device temporally erases the calibration signal injected with the aid of an analogue or digital subtracter, connected downstream of the first chain to be calibrated.

According to particular embodiments, the calibration method comprises one or more of the following characteristics:

the third step is executed after the second step, the subtracter is an analogue subtracter, connected directly downstream of the first chain to be calibrated, and the compensation filter is a digital compensation filter disposed upstream of the radiofrequency chain to be calibrated, when the first chain is the chain of a transmitter; or the third step is executed after the second step, the subtracter is a digital subtracter, connected directly downstream of the compensation filter, and the compensation filter is a digital compensation filter, disposed directly downstream of the first chain to be calibrated, when the first chain to be calibrated is the chain of a receiver; or the third step is executed before the second step, the subtracter is a digital subtracter connected directly between upstream the first chain to be calibrated and downstream the compensation filter, and the compensation filter is a digital compensation filter, disposed directly downstream of the digital subtracter, when the first chain to be calibrated is the chain of a receiver.

The invention proposes a solution to the problem of the dynamic calibration of reception and emission processing chains including analogue functions that are sources of dispersion of the frequency response.

In contradistinction to the known schemes, this solution makes it possible to apply a measurement signal of large amplitude in narrowband or in broadband, without additional spectrum spreading, and with no significant impact on the quality of the useful signal (the traffic signal in the case of a telecommunications payload) transmitted at the output of the chain in terms of absence of service interruption and absence of interference.

This solution reconciles calibration performance by virtue of a measurement of the calibration signal with high SNR ("Signal to Noise Ratio") and transparency for the useful telecommunications service in terms of absence of service interruption and absence of interference in relation to the useful signal.

The calibration need relates particularly to satellite-borne telecommunications payloads which are confronted with cyclic variations of temperature and of power supply, as well as with the effect of the radiations and ageing on lifetimes that may exceed fifteen years.

BRIEF DESCRIPTION OF THE DRAWINGS

The invention will be better understood on reading the description of several embodiments which will follow, given solely by way of example and while referring to the drawings in which:

FIGS. 8A and 8B are flowcharts of a general method of dynamic calibration of a radiofrequency chain of a satellite payload encompassing the methods of dynamic calibration of FIGS. 2, 4 and 6.

DETAILED DESCRIPTION

Figure 1:
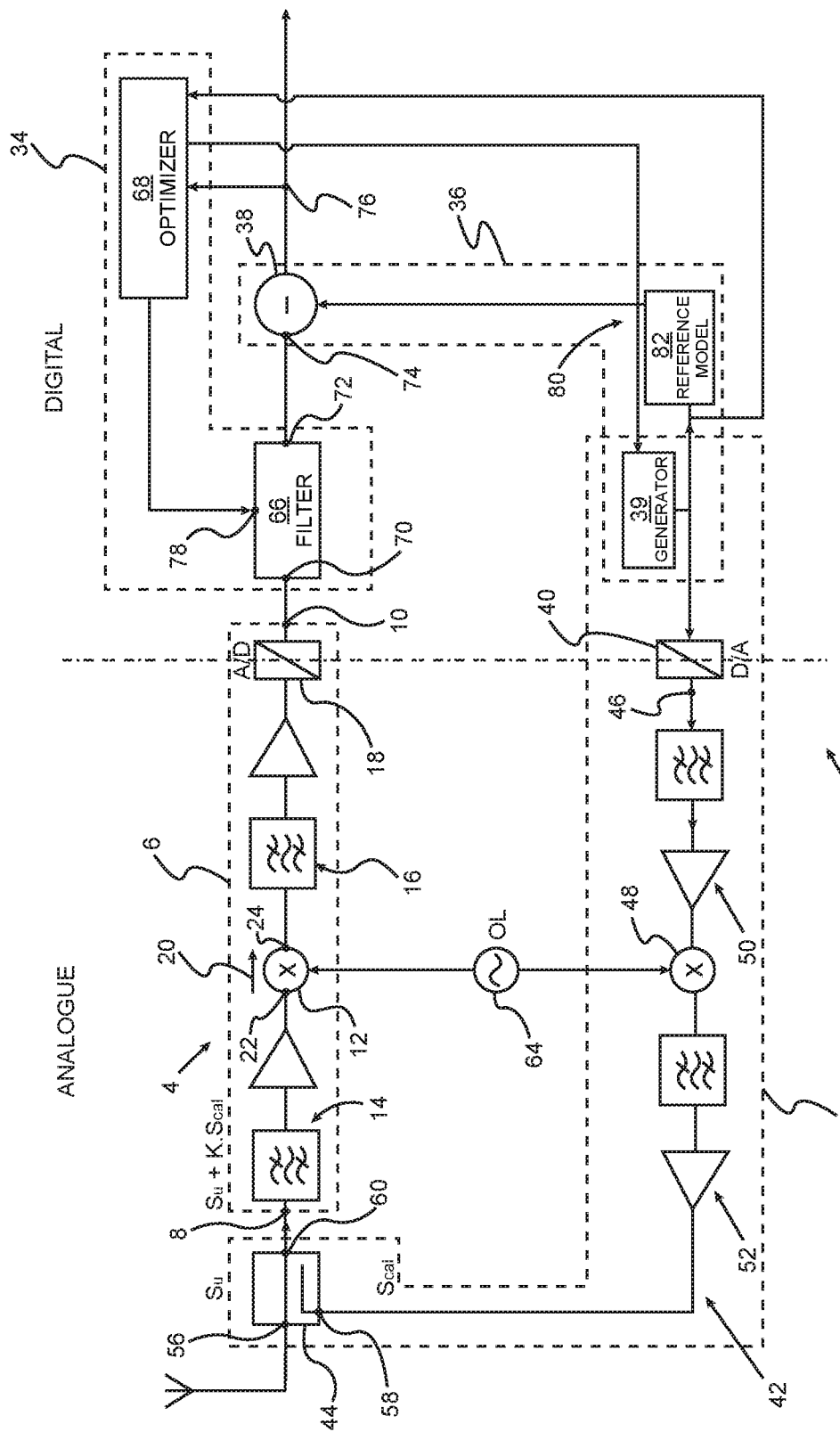
FIG. 1 is a view of a first embodiment according to the invention of a system for dynamic calibration of a radiofrequency transmission chain of a satellite payload in the case where the chain is that of a receiver circuit.

According to FIG. 1 and a first embodiment, a system for dynamic calibration 2 of an RF radiofrequency circuit 4 of a satellite payload is represented.

The RF radiofrequency circuit 4 to be calibrated comprises a first analogue RF radiofrequency transmission chain 6 to be calibrated on a useful chain band, the first analogue radiofrequency chain 6 lying between, upstream, a first upstream port 8 for receiving a first radiofrequency input signal and, downstream, a first downstream port 10 for providing a first output signal.

The first digital output signal is the frequential and temporal response of the first analogue chain 6 to be calibrated to the first radiofrequency input signal.

The first analogue radiofrequency chain 6 to be calibrated is here an analogue chain of a communication receiver which comprises a first frequency down-transposition circuit 12, a first upstream amplification stage 14, disposed upstream of the first transposition circuit 12, a first downstream amplification stage 16, disposed downstream of the first transposition circuit 12, and a first output analogue-digital converter ADC 18 whose digital output is connected to the first downstream port 10 of the first analogue radiofrequency chain 6 to be calibrated. The upstream to downstream direction of the first chain 6 is represented by an arrow 20, oriented from the RF input port 22 to the RF output port 24 of the frequency down-transposition circuit 12.

Generally, the first radiofrequency chain to be calibrated can contain an arbitrary number of amplifiers, greater than or equal to one, and not necessarily limited to two amplifiers.

As a variant, the first radiofrequency chain to be calibrated can be devoid of frequency transposition by mixer and local oscillator.

The automatic calibration system 2 comprises:

an injection device 32 for injecting a second calibration signal whose waveform is predetermined, disposed at the input and upstream of the first analogue radiofrequency chain 6 to be calibrated, and a compensation device 34 for compensating the frequential and temporal response of the first radiofrequency chain 6 to be calibrated on the useful band of the first chain 6, and a device 36 for temporal erasure of the second injected calibration signal having a digital subtracter 38.

The device 32 for injecting the second calibration signal comprises, placed in series and successively, a digital generator 39 of a second digital reference calibration signal, a second digital-analogue converter 40 DAC, and a second chain 42, here for analogue injection.

The second analogue injection chain 42 includes at the output end an analogue coupler 44, configured to operate as an analogue summator or adder of two analogue signals, the two analogue signals being formed by a third useful input signal and the second injected calibration signal.

The second calibration signal has a useful bandwidth of less than or equal to the useful bandwidth of the first chain to be calibrated.

The second chain 42, here for analogue injection, comprises an input port 46, connected to the analogue output of the second digital-analogue converter DAC 40.

The second analogue injection chain 42 comprises here a second frequency up-transposition circuit 48, a second upstream amplification stage 50, disposed upstream of the second transposition circuit 48, a second downstream amplification stage 52, disposed downstream of the second transposition circuit 48.

The injection device 32 is here configured to inject, into the upstream input port 8 of the first analogue chain 6 to be calibrated, the second calibration signal which has the same waveform, to within a frequency transposition, as the digital reference calibration signal, generated by the reference generator 39.

The injection of the second calibration signal takes place through the analogue coupler 44 which comprises a first injection input port 56, connected at the output of an antenna source, a second injection input port 58, connected downstream of and to the analogue radiofrequency output of the second analogue chain 42, and a third injection output port 60, connected to the upstream input port 8 of the first analogue chain 6 to be calibrated.

The first injection input port 56 is configured to receive the third useful input signal, for example a communication traffic signal, designated by $S_u(t)$, while the second injection input port 58 is configured to receive the second calibration signal, designated by $S_{Cal}(t)$ and provided at the output of the second analogue injection chain 42.

The third injection output port 60 is configured to provide at the input 8 of the first chain 6 to be calibrated the first input signal $S_u(t)+K \cdot S_{Cal}(t)$, equal to the temporal sum of the traffic signal $S_u(t)$ and of the coupled calibration signal $K \cdot S_{Cal}(t)$, K designating a coupling factor of the summator coupler 44.

The injection device 32 is configured to inject the second calibration signal at high level, so as to make it possible to optimize the precision of the estimation of the spectral and temporal response of the first chain to be calibrated, and to make it possible to optimize the compensation of the chain to be calibrated.

In practice, the power of the second calibration signal is tailored dynamically in relation to that of the useful signal so as not to saturate the first output analogue-digital converter ADC 18. The adjustment is for example carried out at the level of the digital generation 39 of the signal, the second analogue chain 42 having a constant gain.

Here, the frequency of the transposition signal of the first down-transposition circuit and the frequency of the second up-transposition circuit are identical and the transposition signal is provided by one and the same local oscillator 64, slaved to a master reference clock, not represented in FIG. 1. Likewise the sampling clocks of the output analogue-digital converter 18 of the first chain 6, of the input digital-analogue converter 40 of the second analogue chain 42, and of the digital generator 39 of the reference calibration signal are synchronized here preferably to the master reference clock.

Generally, all the mixers of the various chains use one and the same local oscillator signal OL, to within a phase shift, to carry out the upward or downward frequency transpositions.

Generally, all the analogue-digital ADC and digital-analogue DAC converters use one or more sampling clock signals derived from a common reference signal.

As a variant, the local oscillator signal OL used for the transpositions is neither identical, nor derived from one and the same clock reference as the clock signal common to the analogue-digital ADC and digital-analogue DAC converters.

The compensation device 34 for compensating the frequential and temporal response of the first radiofrequency chain 6 to be calibrated comprises here a compensation filter 66 for compensating on the frequency band of the first analogue chain 6 to be calibrated the amplitude-wise and phase-wise disparities caused by the said first analogue chain 6 to be calibrated, and an optimizer 68 of the coefficients of the compensation filter.

The compensation filter 66 is disposed here directly downstream of the first radiofrequency chain 6 to be calibrated and directly upstream of the digital subtracter 38 of the temporal erasure device 36. The compensation filter 66 comprises an input port 70, connected to the first downstream port 10 of the first chain 6, and an output port 72, connected to a first input port 74 of the digital subtracter 38.

The compensation filter 66 is configured to implement the compensation on the basis of filtering coefficient commands of the said compensation filter 66, the commands being determined on the basis of measurements of a fourth observed signal that are captured here directly downstream of the subtracter in a port 76 for capturing measurement(s).

The optimizer 68 is here an optimizer using adaptive processing, that is to say iterative or recursive processing within a slaving, or using block-wise processing of a set of samples measured block-wise, connected here between the port 76 for capturing measurement(s) and a control port 78 of the compensation filter 66.

The optimizer 68 is configured to determine the commands for the coefficients of the compensation filter 66 on the basis of measurements of the fourth observed signal that are captured directly downstream of the digital subtracter 38 in the port 76 for capturing measurement(s), and on the basis of the second reference calibration signal arising from the digital generator 39.

Generally and according to diverse variants, the adaptive or block-wise optimizer 68 can operate equally on the measurement points 70, 72 or 74, and 76, in a sequential or joint manner, according to the optimization algorithm employed. Indeed, according to the state of progress of the calibration process, or according to the type of optimization algorithm employed, the measurement can be captured at various points (i.e the points 70, 72, or 76) so as to improve the performance and facilitate the convergence of the algorithm. The objective of the optimizer is to configure, via the control port 78, a compensation actuator (a compensation filter 66 for FIG. 1 or another device) on the basis of measurements of one of the points 70, 72 or 76, chosen as measurement point and of the reference calibration signal arising from the generator 39 of the reference calibration signal. Thus the optimizer comprises a second input terminal for receiving the reference calibration signal arising from the generator 39 of the calibration signal. The algorithm used in the optimizer can operate in the temporal or frequency domain, in an iterative/recursive manner or per block of samples. The algorithms employed in the optimizer can be equally: Fourier Transform algorithms, algorithms of least squares type such as for example the LS ("Least Square"), LMS ("Least Mean Square"), RLS ("Recursive Least Squares") algorithms, algorithms using covariances or correlations, algorithms of CMA ("Covariance Matrix Adaptation") type.

The temporal erasure device 36 comprises the digital generator 39 of the second digital reference calibration signal shared with the injection device 32, the digital subtracter 38, and a third digital chain 80 for providing a replica of the reference calibration signal to be subtracted, adapted in terms of a transposition frequency compatible with the output frequency of the first radiofrequency chain 6 to be calibrated, and of a gain and delay compatible with the gains and propagation times of the signal along the propagation path passing successively through the injection device 32, the first radiofrequency chain 6 to be calibrated and the compensation filter 66.

Here, the third digital chain 80 comprises a modelling circuit 82 or a digital reference "model" of the temporal and frequential response of the first chain 6 to be calibrated and of the compensation filter 66, the said modelling circuit 80 being configured to serve as reference to the adaptive optimizer 68. The chosen model corresponds to ideal compensation of the first chain 6 to be calibrated and the transfer function carried out by the model reduces to a uniform predetermined temporal shift over the entire band of the traffic signal.

Thus, the temporal erasure device 36 is configured to subtract in a coherent manner an adapted replica of the reference calibration signal.

The digital circuits forming the injection device in part, and the compensation device in totality, and the temporal erasure device in totality are embodied for example by discrete digital circuits or integrated into one or more dedicated integrated circuits.

The digital circuits forming the injection device in part, and the compensation device in totality, and the temporal erasure device in totality can be replaced with one or more programmable conventional electronic processors, the digital functions of the digital circuits being carried out with the aid of software modules executed by the said processor or processors.

Figure 2:
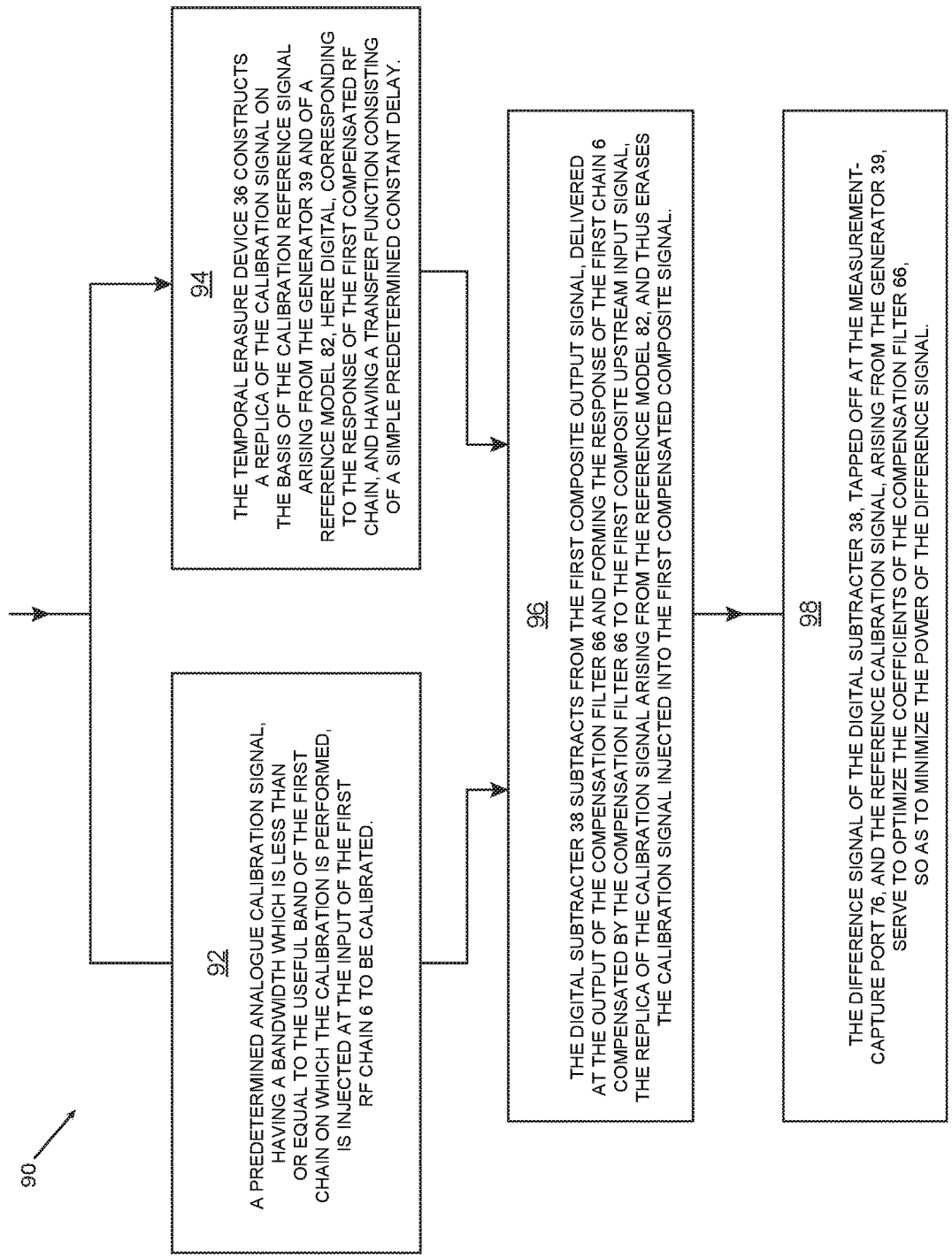
FIG. 2 is a flowchart of a first embodiment according to the invention of a method for dynamic calibration of a radiofrequency transmission chain of a satellite payload, corresponding to the implementation of the dynamic calibration system of FIG. 1.

According to FIG. 2 and a first embodiment, a method for dynamic calibration 90 of a first radiofrequency analogue reception chain 6 of a satellite payload, implemented by the dynamic calibration system 2 of FIG. 1, comprises a set of steps.

In a first step 92, a predetermined analogue calibration signal, having a bandwidth which is less than or equal to the useful band of the first chain on which the calibration is performed, is injected at the input of the first RF chain 6 to be calibrated. The predetermined calibration signal is injected after having been firstly generated by the digital generator 39 of a digital reference calibration signal on a frequency band, and then transposed into a frequency band compatible with the input band of the first RF chain to be calibrated 6, with a power tailored in relation to that of a useful signal so as not to saturate the first output analogue-digital converter ADC 18. Thus the calibration signal is superimposed on the useful traffic signal to form the first upstream input signal, in the guise of a composite signal, the analogue sum of the second signal and of the third signal, and the first upstream input signal passes through all the functions of the first chain 6 to be calibrated 6 as far as the input port 70 of the compensation filter 66.

In a second step 94, executed in parallel with the first step 92, the temporal erasure device 36 constructs a replica of the calibration signal on the basis of the calibration reference signal arising from the generator 39 and of a reference model 82, here digital, corresponding to the response of the first compensated RF chain, and having a transfer function consisting of a simple predetermined constant delay.

Next, in a third step 96, the digital subtracter 38 subtracts from the first composite output signal, delivered at the output of the compensation filter 66 and forming the response of the first chain 6 compensated by the compensation filter 66 to the first composite upstream input signal, the replica of the calibration signal arising from the reference model 82, and thus erases the calibration signal injected into the first compensated composite signal.

Thereafter in a fourth step 98, the difference signal of the digital subtracter 38, tapped off at the measurement-capture port 76, and the reference calibration signal, arising from the generator 39, serve to optimize the coefficients of the compensation filter 66, so as to minimize the power of the difference signal.

The optimization is carried out with the aid of the optimizer 68 included in the assembly formed by the optimizers using adaptive processing, that is to say iterative or recursive processing within a slaving, and the optimizers using block-wise processing of a set of samples measured block-wise.

In the course of the fourth step 98 and generally, the optimizer 68 configures, via the control port 78, a compensation actuator (a compensation filter 66 for FIG. 1 or another device) on the basis of measurements of the point 76, chosen as measurement point, and of the reference calibration signal arising from the generator 39 of the reference calibration signal. The algorithm used in the optimizer can operate in the temporal or frequency domain, in an iterative/recursive manner or per block of samples. The algorithms employed in the optimizer can be equally: Fourier Transform algorithms, algorithms of least squares type such as for example the LS, LMS, RLS algorithms or algorithms using covariances or correlations such as for example algorithms of CMA type.

As a variant, the measurement point 76 is replaced with one of the points 70 and 72.

Figure 3:
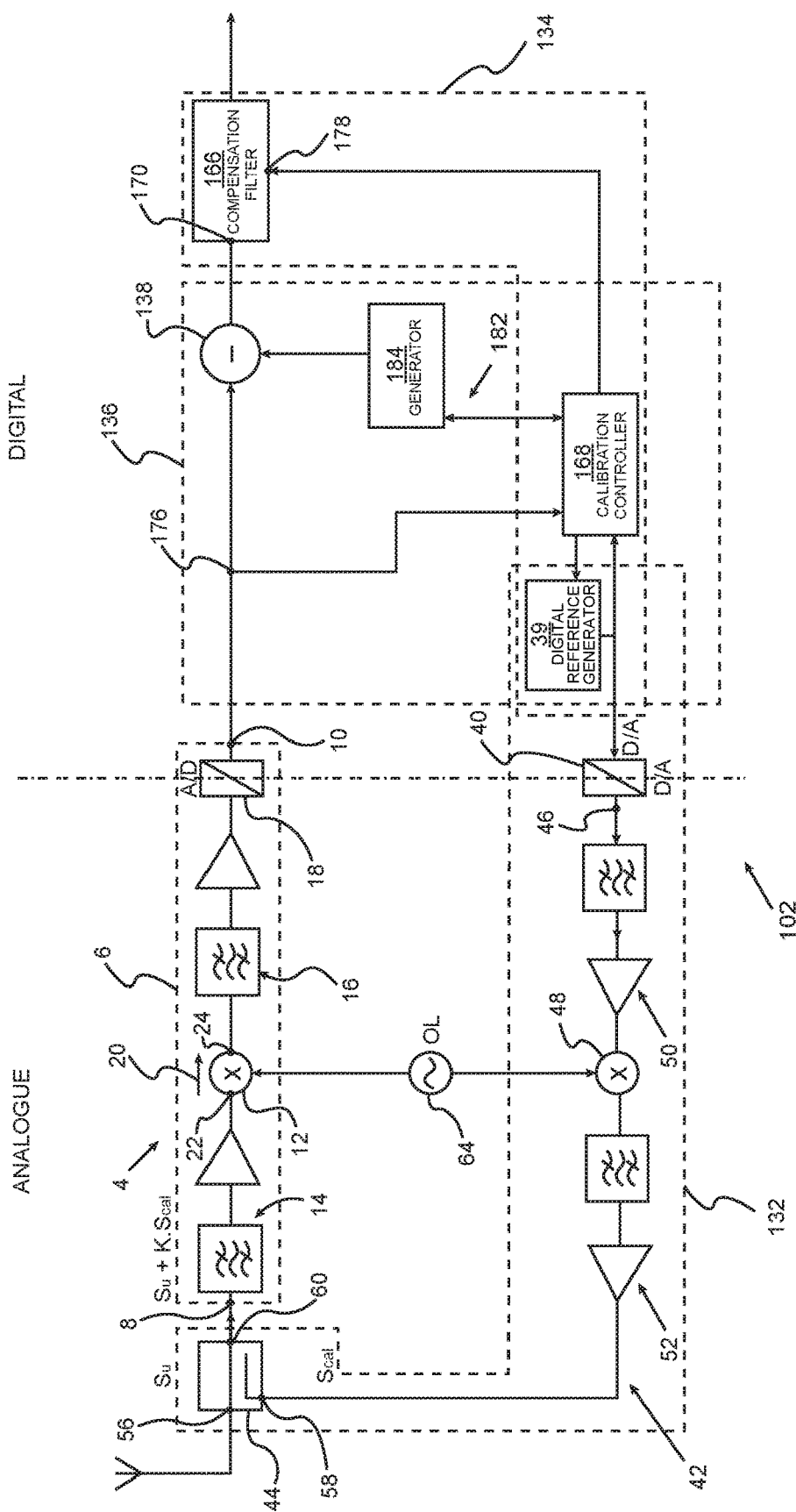
FIG. 3 is a view of a second embodiment according to the invention of a system for dynamic calibration of a radiofrequency transmission chain of a satellite payload in the case where the chain is that of a receiver circuit.

According to FIG. 3 and a second embodiment of the invention, a dynamic calibration system 102 is represented for which the circuit to be calibrated 4 and the diverse elements of this circuit are identical to those of the circuit 4 of FIG. 1 and are designated by the same numerical references.

The dynamic calibration system 102 comprises:

an injection device 132 for injecting a second calibration signal whose waveform is known, disposed at the input and upstream of the first radiofrequency chain to be calibrated 6, and whose architecture is identical or similar to that of the injection device 32 of FIG. 1, and a compensation device 134 for compensating the frequential and temporal response of the first radiofrequency chain 6 to be calibrated on the useful band of the first chain 6, and a device for temporal erasure 136 of the second injected calibration signal having a digital subtracter 138.

In the manner of the injection device 32 of FIG. 1, the injection device 132 is configured to inject the second calibration signal with high level, to make it possible to optimize the precision of the estimation of the spectral and temporal response of the first chain to be calibrated, and to make it possible to optimize the compensation of the first chain 6 to be calibrated.

In practice, the power of the second calibration signal is tailored dynamically in relation to that of the third useful signal so as not to saturate the first output analogue-digital converter ADC 18. The adjustment is for example carried out at the level of the digital generation 39 of the calibration signal, the second analogue chain 42 having a gain that is held constant, or at the level of the second analogue chain 42 by tailoring its gain.

In the manner of the dynamic calibration system 2 of FIG. 1, the frequency of the transposition signal of the first down-transposition circuit 12 and of the second up-transposition circuit 48 is identical, and the transposition signal is provided by one and the same local oscillator 64, slaved to a master reference clock, not represented in FIG. 3. Likewise the sampling clocks of the output analogue-digital converter 18 of the first chain 6, of the input digital-analogue converter 40 of the second analogue chain 42, and of the digital generator 39 of the second reference calibration signal are synchronized here preferably to the master reference clock.

Generally, all the analogue-digital ADC and digital-analogue DAC converters use one or more sampling clock signals derived from a common reference signal.

As a variant, the local oscillator signal OL used for the transpositions is neither identical, nor derived from one and the same clock reference as the clock signal common to the analogue-digital ADC and digital-analogue DAC converters.

The compensation device 134 for compensating the frequential and temporal response of the first radiofrequency chain 6 to be calibrated comprises here a compensation filter 166 of equalizer type on the useful frequency band of the first analogue chain 6 to be calibrated, so as to compensate the amplitude-wise and phase-wise disparities caused by the first analogue chain 6 to be calibrated, and a calibration controller 168, configured to determine commands for the filtering coefficients of the compensation filter 166.

The compensation filter 166 is disposed here directly downstream of the digital subtracter 138 of the temporal erasure device 136, the digital subtracter 138 being disposed directly downstream of the first analogue chain 6 to be calibrated, at the output of the analogue converter 18.

The compensation filter 166 comprises an input port 170, connected to the output port of the digital subtracter 138, and is configured to implement the compensation on the basis of commands for adjusting filtering coefficients of the said compensation filter 166. The adjustment commands are determined on the basis of several measurements of a fourth observed composite signal that are captured directly downstream of the first analogue chain 6 to be calibrated in a port 176 for capturing measurement(s).

The calibration controller 168 is connected between the port 176 for capturing measurement(s) and a control port 178 of the compensation filter 166.

The calibration controller 168 is configured to receive one or more reference calibration signals from the digital generator 39, and to estimate parameters characteristic of the calibration signals observed of the temporal sequence on the basis of the said reference calibration signals.

The calibration controller 168 is thus configured to determine the spectral response of the first analogue chain 6 to be calibrated on the basis of the estimations of the second calibration signals measured at the port 176, and then calculate the response of the compensation filter 166, and thereafter determine the associated coefficients for the compensation filter.

The temporal erasure device 136 comprises the digital generator 39 of the sequence of the second digital reference calibration signals shared with the injection device 132, the calibration controller 168, the digital subtracter 138, and a third digital chain 182 for providing the replicas of the reference calibration signals of the sequence to be subtracted, adapted in terms of a transposition frequency compatible with the output frequency of the radiofrequency chain 6 to be calibrated, of gains and delays compatible respectively with the gains and propagation times of the second calibration signals along the propagation path passing through successively the injection device 132 and the first radiofrequency chain 6 to be calibrated.

Here, the third digital chain 182 comprises the calibration controller 168 serving as estimator of the parameters characteristic of the calibration signals observed after the first analogue chain 6 to be calibrated corresponding to the temporal sequence of the second calibration signals, and a generator 184 of replicas adapted to the second calibration signals observed, and to be subtracted.

Thus, the temporal erasure device 136 is configured to subtract in a coherent manner the adapted replicas of the reference calibration signals of the temporal sequence at the output of the first analogue chain 6 to be calibrated.

The digital circuits forming the injection device in part, and the compensation device in totality, and the temporal erasure device in totality are embodied for example by discrete digital circuits or integrated into one or more dedicated integrated circuits.

The digital circuits forming the injection device in part, and the compensation device in totality, and the temporal erasure device in totality can be replaced with one or more programmable conventional electronic processors, the digital functions of the digital circuits being carried out with the aid of software modules executed by the said processor or processors.

Figure 4:
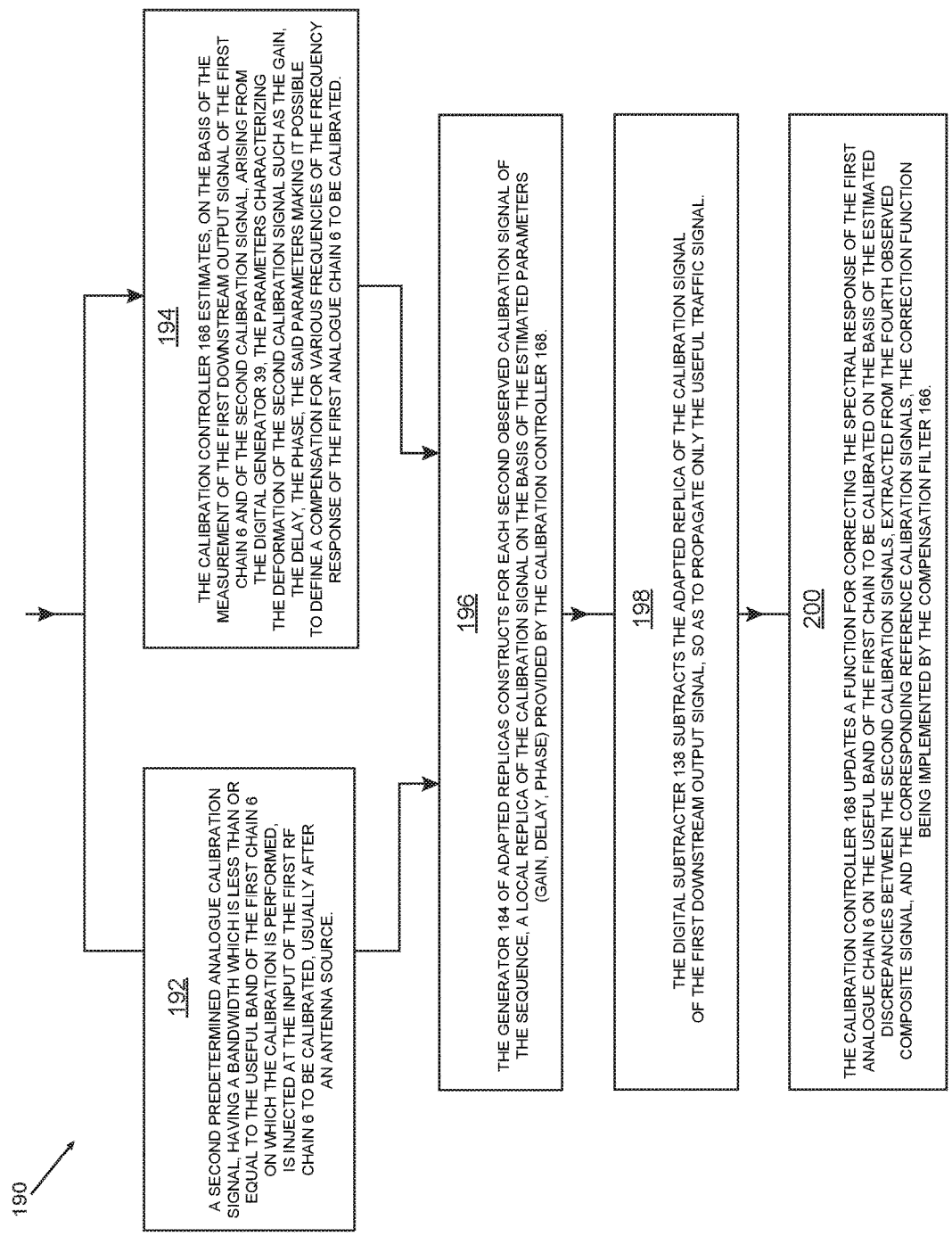
FIG. 4 is a flowchart of a second embodiment according to the invention of a method for dynamic calibration of a radiofrequency transmission chain of a satellite payload, corresponding to the implementation of the dynamic calibration system of FIG. 3.

According to FIG. 4 and a second embodiment, a method for dynamic calibration 190 of a first radiofrequency analogue reception chain 6 of a satellite payload, implemented by the dynamic calibration system 102 of FIG. 3 comprises a set of steps.

In a first step 192, a second predetermined analogue calibration signal, having a bandwidth which is less than or equal to the useful band of the first chain 6 on which the calibration is performed, is injected at the input of the first RF chain 6 to be calibrated, usually after an antenna source. The second predetermined calibration signal is injected after having been generated by the digital reference generator 39 and transposed to a carrier frequency compatible with the input band of the first RF chain 6 to be calibrated, with a power tailored dynamically in relation to that of a third useful signal so as not to saturate the first output analogue-digital converter ADC 18. Thus the calibration signal is superimposed on the useful traffic signal to form the first upstream input signal, in the guise of a composite signal, the analogue sum of the second signal and of the third signal, and the first upstream input signal passes through all the functions of the first chain 6 to be calibrated as far as the input port 170 of the compensation filter 166.

In a second step 194, executed in parallel with the first step 192, the calibration controller 168 estimates, on the basis of the measurement of the first downstream output signal of the first chain 6 and of the second calibration signal, arising from the digital generator 39, the parameters characterizing the deformation of the second calibration signal such as the gain, the delay, the phase, the said parameters making it possible to define a compensation for various frequencies of the frequency response of the first analogue chain 6 to be calibrated.

Thereafter in a third step 196, the generator 184 of adapted replicas constructs for each second observed calibration signal of the sequence, a local replica of the calibration signal on the basis of the estimated parameters (gain, delay, phase) provided by the calibration controller 168.

Next, in a fourth step 198, the digital subtracter 138 subtracts the adapted replica of the calibration signal of the first downstream output signal, so as to propagate only the useful traffic signal.

Thereafter in a fifth step 200, the calibration controller 168 updates a function for correcting the spectral response of the first analogue chain 6 on the useful band of the first chain to be calibrated on the basis of the estimated discrepancies between the second calibration signals, extracted from the fourth observed composite signal, and the corresponding reference calibration signals, the correction function being implemented by the compensation filter 166.

The digital subtracter 138 undertakes the erasure of the measurement signal of the composite signal, by subtracting the adapted replica, defined by the parameters estimated and generated by the adapted-replica digital generator 184 parametrized with the aid of the controller 168, of the fourth observed signal in the measurement-capture port 176, connected here to the first output port downstream of the first chain.

At the output of the digital subtracter 138, the signal carries only the traffic, as if the calibration or measurement signal had not been injected.

The defects of the frequency response of the first reception chain 6 are corrected by the compensation filter 166 in a compensation function whose filtering coefficients have been calculated by the calibration controller 168.

The solutions proposed in the first and second embodiments of the systems and methods for dynamic calibration, described by FIGS. 1 to 4, each allow precise and fast estimation of the defects of the first RF chain as a function of frequency, by virtue of a measurement signal with frequency support of arbitrary width and high level, thereby improving the precision and the speed of measurement of the amplitude/phase defects of the first chain, doing so over the whole useful band and without service interruption and degradation of the useful RF signal for the users.

Figure 5:
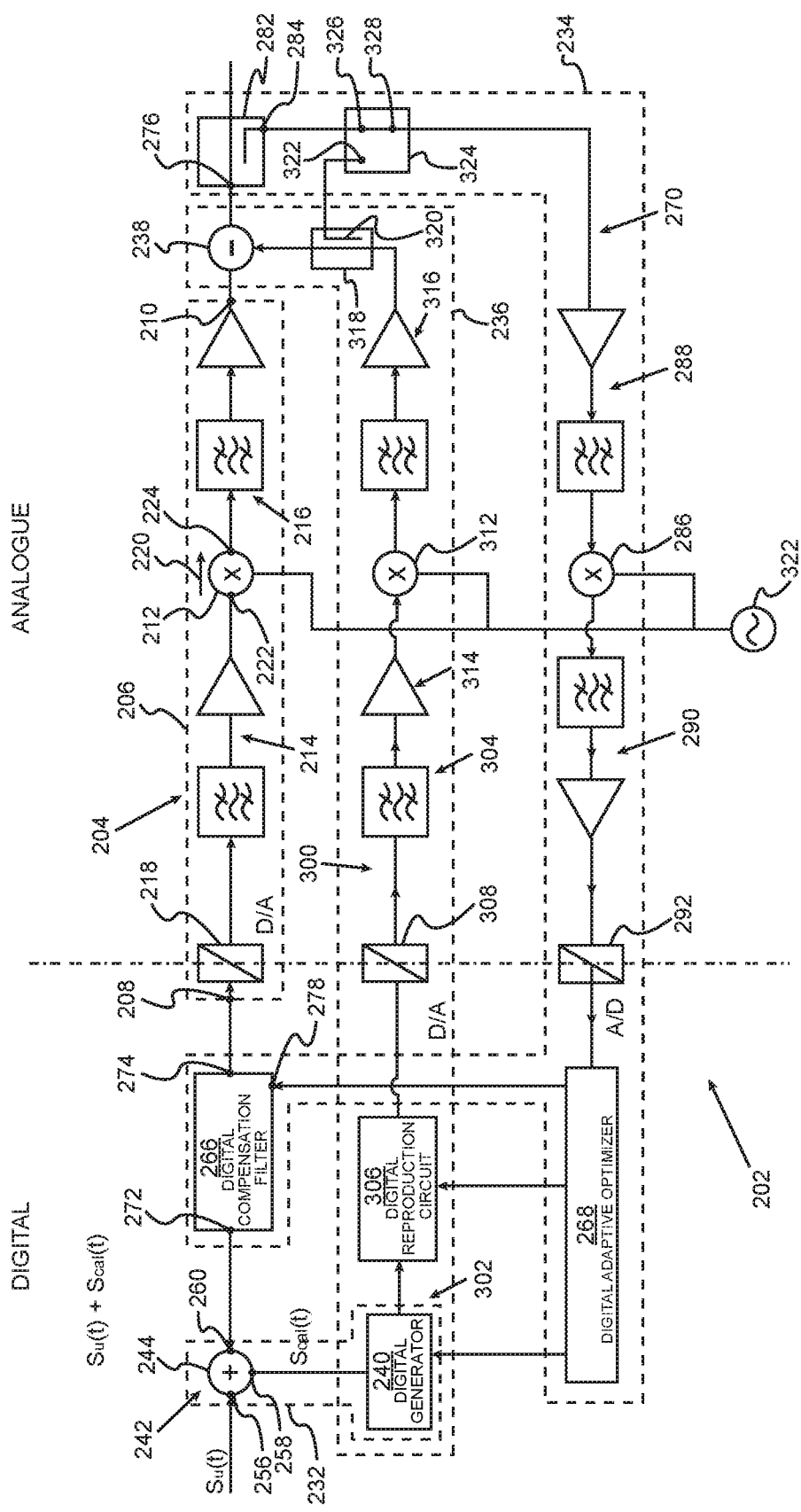
FIG. 5 is a view of a third embodiment according to the invention of a system for dynamic calibration of a radiofrequency transmission chain of a satellite payload in the case where the chain is that of a transmitter circuit.

According to FIG. 5 and a third embodiment of the invention, a system for dynamic calibration 202 of an RF radiofrequency circuit 204 to be calibrated of a satellite payload is represented.

The RF radiofrequency circuit 204 comprises an analogue RF radiofrequency chain 206, forming a first chain to be calibrated on a useful chain band. Here, the first analogue chain 206 is an analogue chain of a communication transmitter, lying between upstream a first upstream port 208 for receiving a first digital input signal and downstream a first downstream port 210 for providing a first analogue output signal.

The first analogue output signal is the frequential and temporal response of the first analogue chain 206 to be calibrated to the first upstream input signal.

The first analogue radiofrequency chain 206 to be calibrated comprises a first frequency up-transposition circuit 212, a first upstream amplification stage 214, disposed upstream of the first transposition circuit 212, a first downstream amplification stage 216, disposed downstream of the first transposition circuit 212, and a first input digital-analogue converter 218 whose input port is connected to the first upstream port 208 of the first radiofrequency chain 206 to be calibrated. The upstream to downstream direction is represented by an arrow 220 oriented from the RF input port 222 to the RF output port 224 of the frequency up-transposition circuit 212.

Generally, the first radiofrequency chain to be calibrated can contain an arbitrary number of amplifiers and/or of filters, greater than or equal to one, and not necessarily limited to two amplifiers.

As a variant, the first radiofrequency chain to be calibrated can be devoid of frequency transposition by mixer and local oscillator.

The automatic calibration system 202 comprises:

an injection device 232 for injecting a second digital calibration signal whose waveform is known, disposed at the input and upstream of the first radiofrequency chain to be calibrated 206, and a compensation device 234 for compensating the frequential and temporal response of the first radiofrequency chain 206 to be calibrated on the useful band of the first chain 206, and a device for temporal erasure 236 of the second injected calibration signal having an analogue subtracter 238.

The injection device 232 for injecting the second calibration signal comprises, placed in series, a digital generator 240 of a digital reference calibration signal, and a second digital injection chain 242, limited here to a digital summator 244 of two digital signals, connected to the said digital generator 240, the two digital signals being formed by a third useful input signal and the second injected calibration signal.

The second calibration signal has a useful bandwidth which is less than or equal to the useful bandwidth of the first chain to be calibrated.

The injection device 232 is here configured to inject the second calibration signal which has the same waveform as the reference calibration signal, generated by the digital generator 240 of the reference calibration signal.

This injection takes place through the digital summator 244 which comprises a first injection input port 256, a second injection input port 258, connected downstream of and to the digital output of the digital generator 240, and a third injection output port 260, connected to the input port 208 of the first chain to be calibrated 206 through a digital compensation filter 266 of the first chain 206 to be calibrated.

The first injection input port 256 is configured to receive the third useful input signal, for example a useful communication traffic signal, designated by $S_u(t)$, while the second injection input port 258 is configured to receive the calibration signal, designated by $S_{Cal}(t)$ and provided at the output of the digital generator 240.

The third injection output port 260 is configured to provide at the input of the digital compensation filter 266 the input signal $S_u(t)+S_{Cal}(t)$, equal to the temporal sum of the traffic signal $S_u(t)$ and of the calibration signal $S_{Cal}(t)$.

The injection device 232 is configured to inject the second calibration signal with high level, so as to make it possible to optimize the precision of the estimation of the spectral and temporal response of the first chain to be calibrated, and to make it possible to optimize the compensation of the first chain to be calibrated.

In practice, the power of the second calibration signal is tailored dynamically in relation to that of the third useful signal so as not to saturate the first digital-analogue converter DAC 218. The adjustment is carried out at the level of the digital generator 240.

The compensation device 234 for compensating the frequential and temporal response of the first radiofrequency chain 206 to be calibrated comprises the compensation filter 266 for compensating on the useful frequency band of the first analogue chain 206 to be calibrated the amplitude-wise and phase-wise disparities caused by the first analogue chain 206 to be calibrated, an optimizer 268 of the coefficients of the compensation filter 266, and a fourth measurement chain 270.

The digital compensation filter 266 is disposed here directly upstream of the first radiofrequency chain 206 to be calibrated and directly downstream of the digital summator 244 of the injection device 232.

The digital compensation filter 266 comprises an input port 272, connected to the output port 260 of the digital summator 244 and a downstream output port 274, connected to the first upstream port 208 of the first chain 206 to be calibrated.

The compensation filter 266 is configured to implement the compensation on the basis of filtering coefficient commands of the said filter 266, the commands being determined on the basis of measurements of a fourth observed analogue signal that are captured directly downstream of the analogue subtracter 238 in a port 276 for capturing measurement(s).

The optimizer 268 is here an optimizer using adaptive processing, that is to say iterative or recursive processing within a slaving, or using block-wise processing of a set of samples measured block-wise, connected indirectly downstream to the port 276 for capturing measurement(s) through the fourth measurement chain 270 and directly upstream to a control port 278 of the compensation filter 266.

The optimizer 268 is configured to determine the commands for the coefficients of the compensation filter 266 on the basis of a set of measurements of the fourth observed signal that are captured directly downstream of the analogue subtracter 238 in the port 276 for capturing measurement(s), and on the basis of the second reference calibration signal arising from the digital generator 240.

Generally and according to diverse variants, the adaptive or block-wise optimizer 268 can operate in an iterative or block-wise manner, according to the optimization algorithm employed. The objective of the optimizer is to configure, via the control port 278, a compensation actuator (a compensation filter 266 for FIG. 5 or another device) on the basis of measurements of the point 276, chosen as measurement point, and of the reference calibration signal arising from the generator 240 of the reference calibration signal. Thus the optimizer comprises a second input terminal for receiving the reference calibration signal arising from the generator 240 of the calibration signal. The algorithm used in the optimizer can operate in the temporal or frequency domain, in an iterative/recursive or block-wise manner. The algorithms employed in the optimizer can be equally: Fourier Transform algorithms, algorithms of least squares type such as for example the LS, LMS, RLS algorithms, algorithms using covariances or correlations, algorithms of CMA type.

The fourth measurement chain 270 is an analogue chain for conveying measurements of the fourth observed signal that are captured directly downstream of the analogue subtracter 238, as far as the digital adaptive optimizer 268.

The fourth analogue measurement chain 270 comprises upstream a measurement coupler 282 with one input pathway, connected to the measurement-capture port 276, and two output pathways, one of which is a measurement extraction pathway connected to a measurement port 284.

The fourth analogue measurement chain 270 comprises a fourth frequency down-transposition circuit 286, a fourth upstream amplification stage 288 disposed upstream of the fourth down-transposition circuit 286 and connected at input to the measurement port 284, a fourth downstream amplification stage 290 disposed downstream of the fourth down-transposition circuit 286, and an output analogue-digital converter 292 disposed at the downstream end of the measurement chain 270.

The temporal erasure device 236 comprises the digital generator 240 of the digital reference calibration signal shared with the injection device 232, the analogue subtracter 238, and a third digital-analogue hybrid chain 300 for providing a replica of the reference calibration signal to be subtracted, adapted in terms of a transposition frequency compatible with the output frequency of the radiofrequency chain 206 to be calibrated and a delay compatible with the propagation times of the signal along the propagation path passing successively through the first radiofrequency chain 206 to be calibrated and the compensation filter 266.

Here, the third digital-analogue hybrid chain 300 comprises, placed in series, a third digital sub-chain 302 and a third analogue sub-chain 304.

The third digital sub-chain 302 includes in series a digital reproduction circuit 306 for reproducing a digital reference model of a temporal and frequential response of the first radiofrequency chain 206 and of the compensation filter 266 of the first chain 206 when the compensation filter 266 is optimized, and for correcting the amplitude-wise and phase-wise dispersions caused by the third analogue sub-chain 304, and a third digital-analogue converter 308.

The third analogue sub-chain 304 comprises a third frequency up-transposition circuit 312, a third upstream amplification stage 314, disposed upstream of the third transposition circuit 312, a third downstream amplification stage 316, disposed downstream of the third transposition circuit 312, and a measurement coupler 318, connected between the third downstream stage 316 and the analogue subtracter 238, and whose line 320 for reporting the measurements is connected to a first input port 322 of a switch 324 with two inputs 322, 326 and one output 328.

The switch 324, connected between on the one hand the input terminal 284 of the measurement coupler 282 through its second input port 326, and on the other hand the input of the fourth upstream amplification stage 288 through its output port 328, is configured to repatriate selectively on command measurements captured from among measurements at the output of the first analogue chain 206 to be calibrated and measurements at the output of the third analogue sub-chain 304. It should be noted that the reproduction circuit 306 for reproducing a digital reference model is configured to receive correction commands for the temporal and frequential response of the third analogue sub-chain 304, the said correction commands being determined by the digital adaptive optimizer 268, and the measurement chain 270 being assumed to be calibrated and not to affect the measurements performed in the measurement capturer 276.

The analogue subtracter 238 is here a device included in the set made up of 180° hybrid couplers and ring hybrid couplers, each of these devices being configured to carry out the in-opposition combination of the first output signal of the first chain to be calibrated 206 and of the hybrid chain output signal 300.

As a variant, the erasure device 236 carries out the subtraction of the calibration signal on the basis of a coupler carrying out the in-phase combination of the first signal at the output of the first chain to be calibrated 206 and of the signal at the output of the hybrid chain 300, one of these signals previously being inverted either in one of the compensation filters (266 or 306), or at the level of the signal generator 240, or by a 180° phase shift of the local oscillator signal OL at the input of one of the frequency transposition circuits 212 or 312.

Here, the frequencies of the transposition signals of the first up-transposition circuit 212 in the guise of transposition circuit of the first chain, of the third up-transposition circuit 312 in the guise of transposition circuit of the third chain, and of the fourth down-transposition circuit 286 in the guise of transposition circuit of the fourth chain are identical and a common transposition signal is provided by one and the same shared local oscillator 322, slaved to a master reference clock, not represented in FIG. 5. Likewise the sampling clocks of the analogue-digital converter 292, of the digital-analogue converters 218, 308, and of the digital generator 240 of the reference calibration signal are synchronized to the master reference clock.

Generally, all the mixers of the various chains use one and the same local oscillator signal OL, to within a phase shift, to carry out the upward or downward frequency transpositions.

Generally, all the analogue-digital ADC and digital-analogue DAC converters use one or more sampling clock signals derived from a common reference signal.

As a variant, the local oscillator signal OL used for the transpositions is neither identical, nor derived from one and the same clock reference as the clock signal common to the analogue-digital ADC and digital-analogue DAC converters.

As a variant, the first, third, fourth chains are devoid of frequency transposition circuits.

The configuration of the temporal erasure device 236 of FIG. 5 thus makes it possible to subtract in a coherent manner from the first output signal of the first chain 206 to be calibrated an adapted replica of the reference calibration signal.

The digital circuits forming the injection device in totality, and the compensation device in part, and the temporal erasure device in part are embodied for example by discrete digital circuits or integrated into one or more dedicated integrated circuits.

The digital circuits forming the injection device in totality, and the compensation device in part, and the temporal erasure device in part can be replaced with one or more programmable conventional electronic processors, the digital functions of the digital circuits being carried out with the aid of software modules executed by the said processor or processors.

Figure 6:
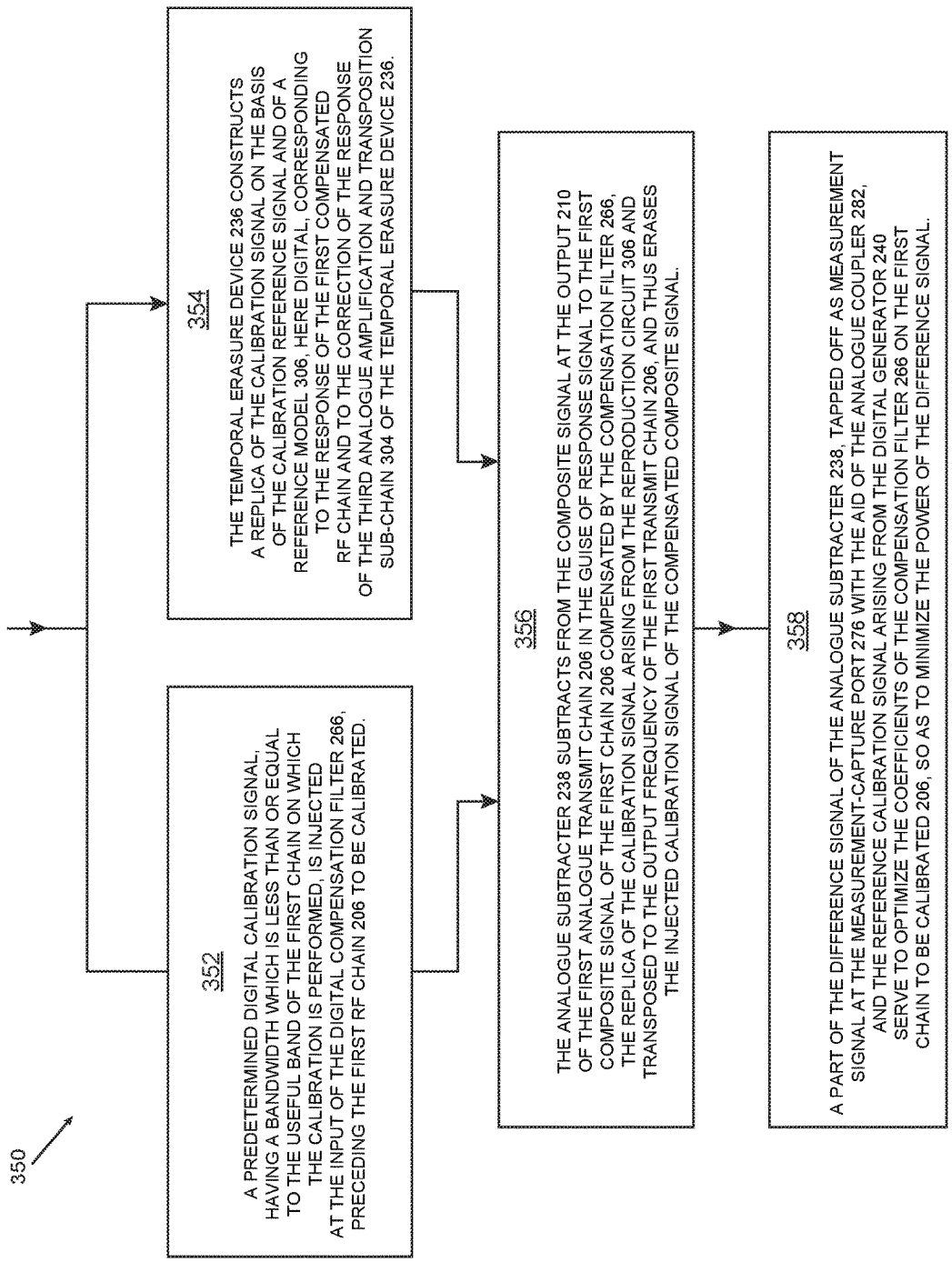
FIG. 6 is a flowchart of a third embodiment according to the invention of a method for dynamic calibration of a radiofrequency transmission chain of a satellite payload, corresponding to the implementation of the dynamic calibration system of FIG. 5.

According to FIG. 6 and a third embodiment, a method of dynamic calibration 350 of a first radiofrequency analogue transmit chain 206 of a satellite payload, implemented by the dynamic calibration system 202 of FIG. 5, comprises a set of steps.

In a first step 352, a predetermined digital calibration signal, having a bandwidth which is less than or equal to the useful band of the first chain on which the calibration is performed, is injected at the input of the digital compensation filter 266, preceding the first RF chain 206 to be calibrated. The predetermined calibration signal is generated by the digital generator 240 of a reference calibration signal in a frequency band included in and compatible with the input band of the first analogue chain 206 to be calibrated, and added digitally to the useful traffic signal so as to form a first upstream composite input signal. The power of the injected calibration signal is tailored in relation to that of the useful traffic signal so as not to saturate the first digital-analogue converter DAC 218. The first upstream composite input signal thereafter passes through all the functions of the first chain 206 to be calibrated as far as the first downstream output port 210.

In a second step 354, executed in parallel with the first step 352, the temporal erasure device 236 constructs a replica of the calibration signal on the basis of the calibration reference signal and of a reference model 306, here digital, corresponding to the response of the first compensated RF chain and to the correction of the response of the third analogue amplification and transposition sub-chain 304 of the temporal erasure device 236. The transfer function of the response of the first compensated RF chain consists of a simple predetermined constant delay over the totality of the useful band of the first chain.

Next, in a third step 356, the analogue subtracter 238 subtracts from the composite signal at the output 210 of the first analogue transmit chain 206 in the guise of response signal to the first composite signal of the first chain 206 compensated by the compensation filter 266, the replica of the calibration signal arising from the reproduction circuit 306 and transposed to the output frequency of the first transmit chain 206, and thus erases the injected calibration signal of the compensated composite signal.

Thereafter in a fourth step 358, a part of the difference signal of the analogue subtracter 238, tapped off as measurement signal at the measurement-capture port 276 with the aid of the analogue coupler 282, and the reference calibration signal arising from the digital generator 240 serve to optimize the coefficients of the compensation filter 266 on the first chain to be calibrated 206, so as to minimize the power of the difference signal.

The optimization is carried out with the aid of the optimizer 268 included in the set made up of optimizers using adaptive processing, that is to say iterative or recursive processing within a slaving, and optimizers using blockwise processing of a set of measurements.

In the course of the fourth step 358 and more generally, the optimizer 268 configures, via a first control port, a compensation actuator (the compensation filter 266 for FIG. 1 or another device) on the basis of measurements of the point 276, chosen as measurement point and of the reference calibration signal arising from the generator 240 of the reference calibration signal. The algorithm used by the optimizer can operate in the temporal or frequency domain, in an iterative/recursive manner or per block of samples. The algorithms employed in the optimizer can be equally: Fourier Transform algorithms, algorithms of least squares type such as for example the LS, LMS, RLS algorithms or algorithms using covariances or correlations such as for example algorithms of CMA type.

The optimizer 268 also configures via a second control port, the reproduction circuit 306 for reproducing a calibration signal adapted for the erasure function on the basis of measurements of the point 276, chosen as measurement point and of the reference calibration signal arising from the generator 240 of the reference calibration signal.

For the formulation of the commands of the compensation filter 266 and of the reproduction circuit 306 for reproducing an adapted replica, the optimizer takes into account the transfer function of the first chain to be calibrated compensated by the compensation filter and of the fourth measurement chain, placed in series.

The difference signal observed at the output of the analogue subtracter 238 and in the steady state, that is to say when the calibration or the compensation has converged, corresponds to the traffic signal alone after elimination or erasure of the calibration signal.

In the same fourth step 358, the measurement signal can also serve to correct the amplitude and phase dispersions caused by the third analogue sub-chain 304 to the erasure signal.

The solution proposed in the third embodiment of the system and method for dynamic calibration, described by FIGS. 5 and 6, allows precise and fast estimation of the defects of the first RF chain to be calibrated, by virtue of a calibration signal having a high injection level at the input of the first chain, thereby improving the precision and the speed of measurement of the amplitude/phase defects of the first chain, doing so over the whole useful band of the first chain and without service interruption and degradation of the useful RF signal for the users.

Generally and independently of the transmitter or receiver structure of the first chain to be calibrated, when the compensation of the first chain to be calibrated is not ideal, the useful signal as well as the calibration signal are affected by distortions.

At the output of the first chain to be calibrated, the distorted calibration signal superimposed on the distorted useful signal not corresponding to the replica of the reference calibration signal, the erasure is imperfect after the subtracter 38 in FIG. 1, 238 in FIG. 5, 138 in FIG. 3, and there remains a calibration signal residual superimposed on the useful signal.

Thus the useful signal at the output of the chain to be calibrated and after subtraction is doubly affected by the distortions of the first insufficiently compensated chain and by the insufficiently erased calibration signal residual.

The erasure may be imperfect if the erasure replica is insufficiently tailored to the multiplex signal at the output of the first chain to be calibrated.

This is the case in the absence of precise a priori knowledge of the spectral and temporal response of the first chain to be calibrated, either on startup, or because of a significant evolution of the response of the chain between two calibrations.

In the case where the erasure is imperfect, the residual calibration signal constitutes a source of interference for the useful signal.

To limit the interference of the calibration signal residual on the useful signal in the case mentioned, one solution consists in iterating several calibration cycles while progressively increasing the power of the calibration signal injected upstream of the first chain to be calibrated. Each new cycle makes it possible to improve the knowledge of the spectral and temporal response of the first chain, and makes it possible to improve its compensation, and indirectly allows better pairing of the calibration signal at the chain output with the replica of the reference calibration signal, so as ultimately to optimize the quality of the erasure of the calibration signal at the output of the first chain.

Subsequently, when the knowledge of the spectral and temporal response of the first chain is acquired and considered stable, the optimizer 68, 168, 268 can carry out a faster periodic calibration by injecting the calibration signal directly on a high level, so as to have a good precision of calculation of the compensation, while guaranteeing the absence of saturation of the analogue-digital converter, designated by the numerical reference 18 in FIGS. 1 and 3 for a receive chain, and designated by the numerical reference 292 for a transmit chain.

Generally, a dynamic calibration system according to the invention makes it possible to calibrate a radiofrequency circuit of a satellite payload comprising one or more first chains of receivers, and/or one or more chains of transmitters.

The previous calibration devices, described in FIGS. 1, 3 and 5 are generalizable to calibrate in sequence a set of an integer number N of first analogue chains by pooling certain hardware and software resources, so as to limit the hardware complexity, the electrical consumption.

In the case of analogue chains of receive type such as illustrated in FIGS. 1 and 3, the injection chain 32, 132 is pooled for the set of N reception chains to be calibrated. The analogue calibration signal is injected at the input of the set of chains to be calibrated either simultaneously with a 1:N divider (splitter), or sequentially with a 1:N switching matrix, these elements being connected upstream of the couplers 44.

In the case of analogue chains of transmit type such as illustrated in FIG. 5, the replica chain of the temporal erasure device 236 as well as the measurement chain of the compensation device 234 are pooled for the set of N transmit chains to be calibrated.

The reference calibration analogue signal adapted for subtraction is injected at the output of the set of N chains to be calibrated either simultaneously with a 1:N divider, or sequentially with a 1:N switching matrix, these elements being connected upstream of the couplers 238.

The analogue measurement signal at the output of the couplers 284 is selected by an N:1 switching matrix connected downstream of the couplers 284 and upstream of the measurement chain 234.

Figure 7:
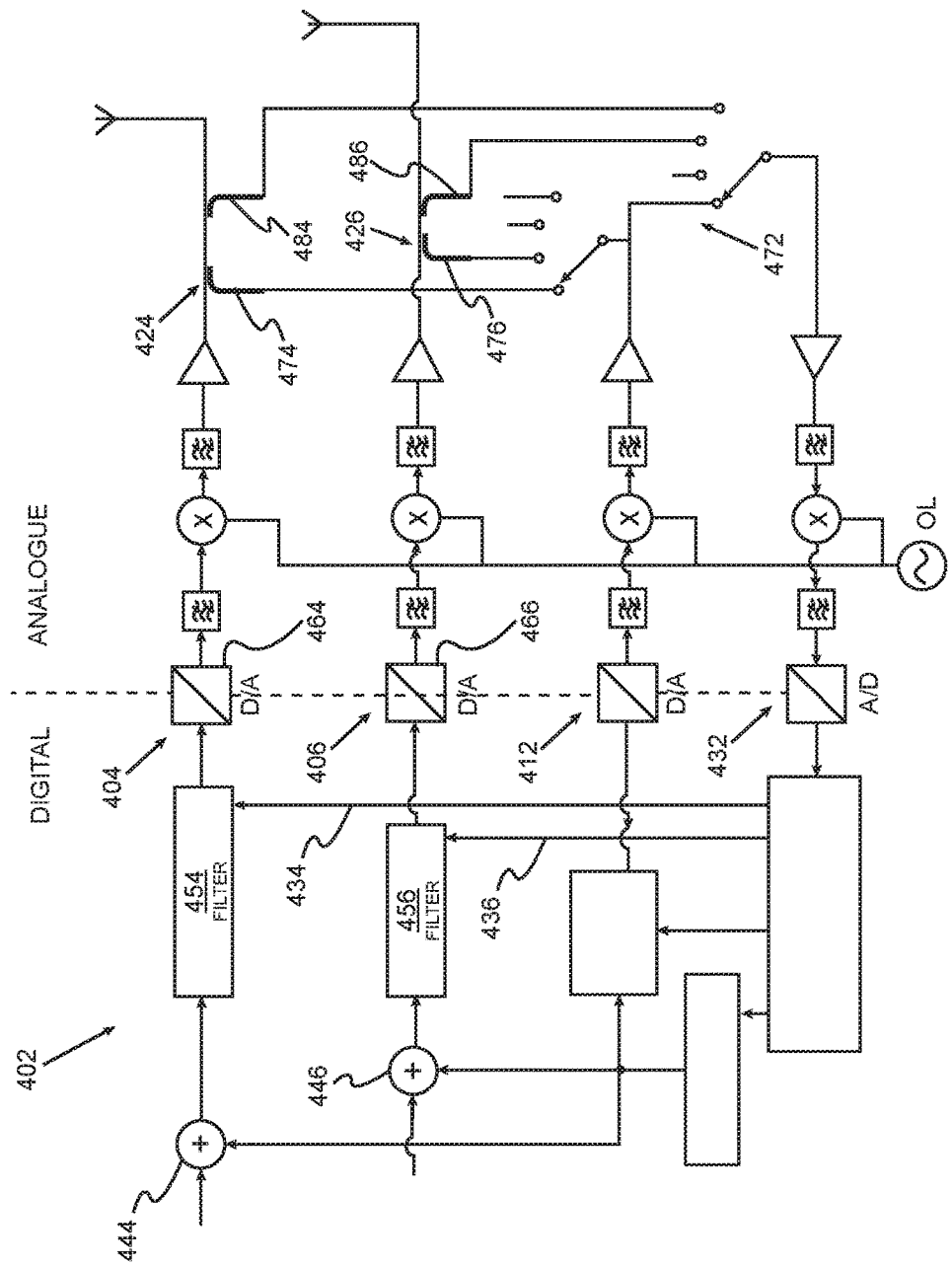
FIG. 7 is a view of a fourth embodiment according to the invention of a system for dynamic calibration of a set of N emission radiofrequency chains of a satellite payload.

According to FIG. 7 and a fourth embodiment, a system for dynamic calibration 402 of a set of two first analogue transmit chains to be calibrated 404, 406 comprises a calibration or reference signal replica chain 412, pooled with first and second temporal erasure devices 424, 426, associated respectively with the first first analogue chain 404 and with the second first analogue chain 406.

The dynamic calibration system 402 also comprises a measurement chain 432 pooled with first and second compensation devices 434, 436, associated respectively with the first first analogue chain 404 and with the second first analogue chain 406.

The dynamic calibration system 402 comprises here a first and a second injection summator 444, 446, connected respectively upstream of first and second compensation filters 454, 456, themselves connected respectively upstream of first and second digital-analogue converters 464, 466, the first digital-analogue converter 464 and the second digital-analogue converter 466 forming respectively an input of the first analogue chain 404 and an input of the second first analogue chain 406.

The dynamic calibration system 402 comprises a network of switches 472 configured to convey in a selective manner calibration replica signals from the pooled replica chain to a first analogue subtracter 474 and a second analogue subtracter 476, and to convey in a selective manner output measurement signals of the first first and second first analogue chains to be calibrated from a first analogue coupler 484 and a second analogue coupler 486 for tapping off to the pooled measurement chain 432.

The first analogue subtracter 474 and the first analogue coupler 484 for tapping off are connected together and at the output of the first chain to be calibrated 404, while the second analogue subtracter 476 and the second analogue coupler 486 for tapping off are connected together and at the output of the second chain to be calibrated 406.

Generally, a first radiofrequency chain to be calibrated is an analogue chain for amplification and filtering with or without transposition to a predetermined transposition frequency of a first input signal, made up of the temporal sum of a second calibration signal and of a third useful input signal.

The first radiofrequency chain to be calibrated on a useful chain band lies between upstream a first upstream port for receiving the first input signal and downstream a first downstream port for providing the first output signal, the first output signal being the frequental and temporal response of the radiofrequency chain to be calibrated to the first input signal.

Generally, the automatic calibration system comprises:
a device for injecting a second calibration signal whose waveform is predetermined upstream of the radiofrequency chain to be calibrated, the second calibration signal being injected directly in digital form or indirectly in analogue form through a second analogue injection chain on the basis of a reference calibration signal;
a device for compensating the frequental and temporal response of the first radiofrequency chain to be calibrated, comprising a filter for compensation on the useful frequency band of the first chain to be calibrated, the compensation filter being disposed upstream or downstream of the first radiofrequency chain to be calibrated and the compensation being carried out on the basis of measurements of a fourth signal observed downstream of the first radiofrequency chain to be calibrated and of the compensation filter, or directly downstream of the first chain to be calibrated;
a device for temporal erasure of the injected calibration signal having an analogue or digital subtracter, connected downstream of the first radiofrequency chain to be calibrated.

The analogue or digital subtracter can be connected directly downstream of the first radiofrequency chain to be calibrated or downstream of the compensation filter.

The digital subtracter can be connected directly between upstream the first chain to be calibrated and downstream the compensation filter.

Generally, the temporal erasure device also comprises a third digital or analogue chain for providing a replica of the reference calibration signal to be subtracted.

The replica is adapted in terms of transposition frequency compatible with the output frequency of the radiofrequency chain to be calibrated, of delay compatible with the propagation times of the signal through the injection device and the first radiofrequency chain to be calibrated or through the injection device, the first radiofrequency chain to be calibrated and the compensation filter.

The temporal erasure device is configured to subtract in a coherent manner the adapted replica of the reference calibration signal from the output signal of the first radiofrequency chain to be calibrated so as to minimize the residual of the calibration signal at output.

Figure 8A:
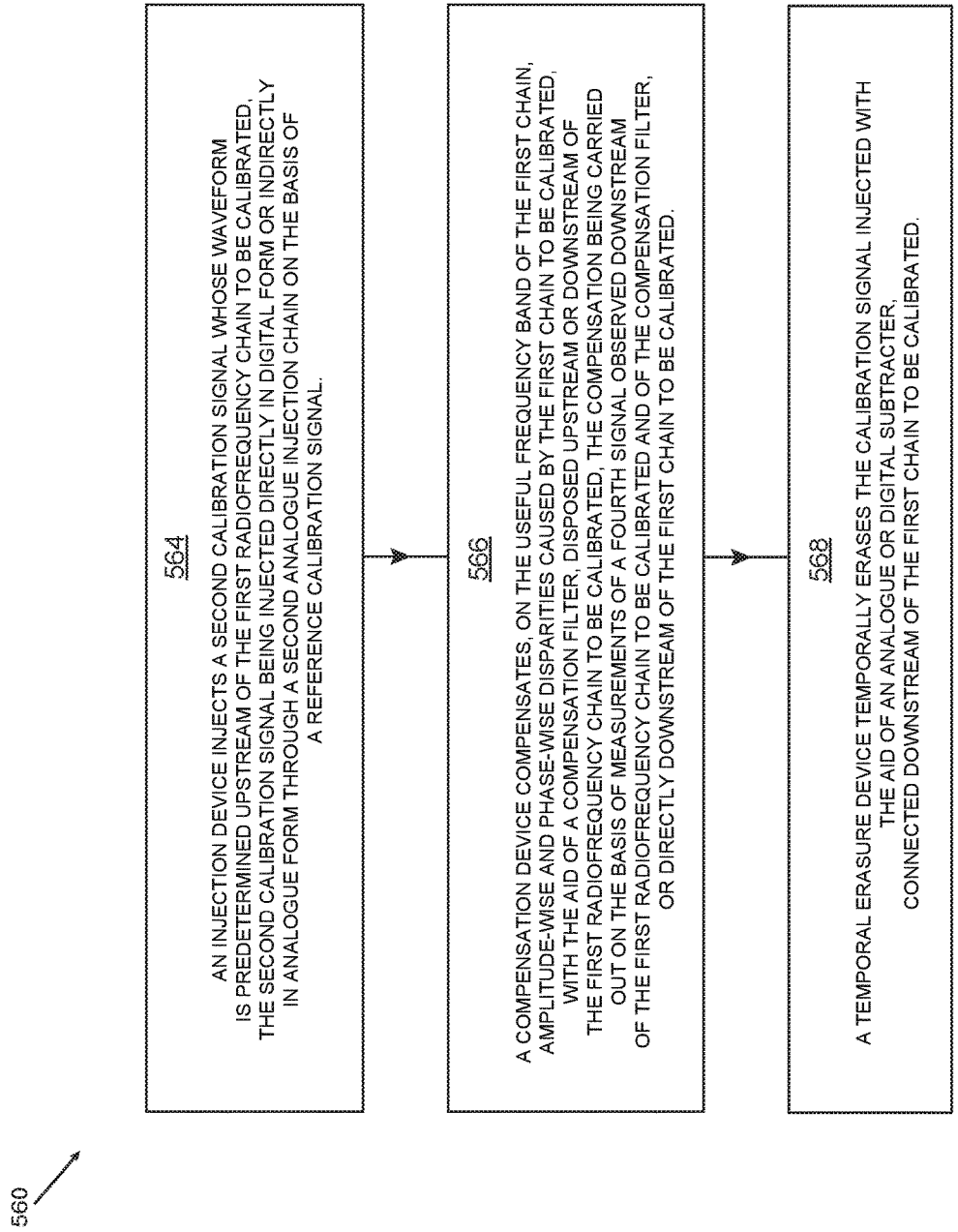

According to FIGS. 8A and 8B, a first general method 560 and a second general method 562 of dynamic calibration of a radiofrequency circuit of a satellite payload encompass the methods of calibration of FIGS. 2, 4 and 6.

The radiofrequency circuit to be calibrated, for example that of a receiver or of a transmitter, comprises a first radiofrequency chain to be calibrated for amplification and for filtering and for transposition to a predetermined transposition frequency of a first input signal made up of the temporal sum of a second calibration signal and of a third useful input signal.

The first radiofrequency chain to be calibrated on a useful chain band lies between upstream a first upstream port for receiving the first input signal and downstream a first downstream port for providing a first output signal, the first output signal being the frequential and temporal response of the first radiofrequency chain to be calibrated to the first upstream input signal.

The first and second general methods 560, 562 comprise a set of steps.

In a first step 564, an injection device injects a second calibration signal whose waveform is predetermined upstream of the first radiofrequency chain to be calibrated, the second calibration signal being injected directly in digital form or indirectly in analogue form through a second analogue injection chain on the basis of a reference calibration signal.

Next, in a second step 566, a compensation device compensates, on the useful frequency band of the first chain, amplitude-wise and phase-wise disparities caused by the first chain to be calibrated, with the aid of a compensation filter, disposed upstream or downstream of the first radiofrequency chain to be calibrated, the compensation being carried out on the basis of measurements of a fourth signal observed downstream of the first radiofrequency chain to be calibrated and of the compensation filter, or directly downstream of the first chain to be calibrated.

In a third step 568, executed after the first step 564, a temporal erasure device temporally erases the calibration signal injected with the aid of an analogue or digital subtracter, connected downstream of the first chain to be calibrated.

According to FIG. 8A and the first configuration 560 of the general method of dynamic calibration, the third step 568 is executed after the second step 566.

This first configuration is for example implemented in the following two cases.

In a first case, the first chain to be calibrated is the chain of a transmitter, the subtracter is an analogue subtracter, connected directly downstream of the first chain to be calibrated, and the compensation filter is a digital compensation filter disposed upstream of the radiofrequency chain to be calibrated.

In a second case, the first chain to be calibrated is the chain of a receiver, the subtracter is a digital subtracter, connected directly downstream of the compensation filter, and the compensation filter is a digital compensation filter, disposed directly downstream of the first chain to be calibrated.

According to FIG. 8B and the second configuration 562 of the general method of dynamic calibration, the third step 568 is executed before the second step 566.

This second configuration is implemented for example in the case where the first chain to be calibrated is the chain of a receiver, the subtracter is a digital subtracter, connected directly between upstream the first chain to be calibrated and downstream the compensation filter, and the compensation filter is a digital compensation filter, disposed directly downstream of the digital subtracter.

The system and the method of dynamic calibration are devised so as to be activated and to operate by choice in a permanent manner, in a periodically or aperiodically repeated manner, or on demand through the dispatching of telecommands from the ground for example.

The invention claimed is:

1. A system for dynamic calibration of a RF radiofrequency circuit of a satellite payload,
the RF radiofrequency circuit comprising a first radiofrequency chain to be calibrated for amplification and for filtering with or without transposition to a predetermined transposition frequency of a first input signal made up of a temporal sum of a second calibration signal and of a third useful input signal,
the first radiofrequency chain to be calibrated on a useful frequency chain band lying between upstream a first upstream port for receiving the first input signal and downstream a first downstream port for providing a first output signal, the first output signal being a frequency and temporal response of the first radiofrequency chain to be calibrated to the first input signal; and
the dynamic calibration system comprising:
a device for injection of the second calibration signal whose waveform is predetermined upstream of the first radiofrequency chain to be calibrated, the second calibration signal being injected directly in digital form or indirectly in analogue form through a second analogue injection chain on a basis of a reference calibration signal, and the band of the second calibration signal being included in the useful frequency band of the first chain to be calibrated; and
a device for compensation of the frequency and temporal response of the first radiofrequency chain to be calibrated, comprising a filter for compensation on the useful frequency band of the first chain to be calibrated, the compensation filter being disposed upstream or downstream of the first radiofrequency chain to be calibrated and the compensation being carried out on a basis of measurements of a fourth signal observed downstream of the first radiofrequency chain to be calibrated and of the compensation filter, or directly downstream of the first chain to be calibrated;
the dynamic calibration system further comprising:
a device configured for temporal erasure of the injected second calibration signal from an output signal of the first radiofrequency chain, the device having an analogue or digital subtracter, connected downstream of the first radiofrequency chain to be calibrated,
wherein
the temporal erasure device also comprises a third digital or analogue chain for providing a replica of the reference calibration signal to be subtracted, adapted in terms of the transposition frequency compatible with an output frequency of the radiofrequency chain to be calibrated and of a delay compatible with a propagation time of a signal passing through the injection device and the first radiofrequency chain to be calibrated, or passing through the injection device, the first radiofrequency chain to be calibrated and the compensation filter; and
the temporal erasure device is configured to subtract in a coherent manner the adapted replica of the reference calibration signal from the output signal of the first radiofrequency chain to be calibrated.

2. The system for dynamic calibration of a radiofrequency circuit of a satellite payload according to claim 1, wherein
the analogue or digital subtracter is connected downstream of the first radiofrequency chain to be calibrated and downstream of the compensation filter, or
the digital subtracter is connected between upstream the first radiofrequency chain to be calibrated and downstream the compensation filter.

3. The system for dynamic calibration of a radiofrequency circuit of a satellite payload according to claim 1,
further comprising a first generator of one or more local oscillator (LO) signals identical to within a phase shift and synchronized to a first reference clock; and wherein
when the first radiofrequency chain to be calibrated comprises one or more frequency transposition circuits; and/or
when the second injection chain is analogue and comprises one or more frequency transposition circuits; and/or
when the third chain for providing the adapted replica is analogue and comprises one or more frequency transposition circuits,
a first transposition circuit or circuits, and/or a second transposition circuit or circuits, and/or a third transposition circuit or circuits are configured to use the same local oscillator signal (LO) to within a phase shift and to carry out upward or downward frequency transpositions.

4. The system for dynamic calibration of a radiofrequency circuit of a satellite payload according to claim 1, wherein
when the injection of the calibration signal is digital, the device for injection of the calibration signal comprises a digital generator of a digital reference calibration signal and a digital summator of the reference calibration signal with a digital traffic signal, and
when the injection of the calibration signal is analogue, the device for injection of the calibration signal comprises a digital generator of a digital reference calibration signal, a digital-analogue converter, and a second analogue injection chain including an analogue coupler operating as summator of two analogue signals, and
the device for injection of the calibration signal is configured to tailor a power of the second calibration signal dynamically in relation to that of the third useful signal to the highest possible level compatible with an absence of saturation of an analogue-digital or digital-analogue converter of the first radiofrequency chain to be calibrated, disposed respectively at the output or at the input of the said first chain.

5. The system for dynamic calibration of a radiofrequency circuit of a satellite payload according to claim 1, further comprising a second generator of one or more sampling clock signals, derived from a common reference clock signal provided by a second reference clock; and wherein
when the first radiofrequency chain to be calibrated comprises an analogue-digital converter (ADC) and/or a digital-analogue converter (DAC), and/or when the second injection chain is analogue and comprises a digital-analogue converter (DAC); and/or
when the third chain for providing the adapted replica is analogue and comprises a digital-analogue converter (DAC); and/or
when the fourth measurement chain is analogue and comprises an analogue-digital converter (ADC);
and/or the digital-analogue converter(s) and/or the digital-analogue converter(s) are mutually synchronized through a local clock or a local oscillator, shared and considered to be master,
all the analogue-digital converters (ADCs) and the digital-analogue converters (DACs) are configured to use the one or more sampling clock signals, derived from the common reference clock signal provided by the second reference clock.

6. A system for dynamic calibration of a RF radiofrequency circuit of a satellite payload,
the RF radiofrequency circuit comprising a first radiofrequency chain to be calibrated for amplification and for filtering with or without transposition to a predetermined transposition frequency of a first input signal made up of a temporal sum of a second calibration signal and of a third useful input signal,
the first radiofrequency chain to be calibrated on a useful frequency chain band lying between upstream a first upstream port for receiving the first input signal and downstream a first downstream port for providing a first output signal, the first output signal being a frequency and temporal response of the first radiofrequency chain to be calibrated to the first input signal; and
the dynamic calibration system comprising:
a device for injection of the second calibration signal whose waveform is predetermined upstream of the first radiofrequency chain to be calibrated, the second calibration signal being injected directly in digital form or indirectly in analogue form through a second analogue injection chain on a basis of a reference calibration signal, and the band of the second calibration signal being included in the useful frequency band of the first chain to be calibrated; and
a device for compensation of the frequency and temporal response of the first radiofrequency chain to be calibrated, comprising a filter for compensation on the useful frequency band of the first chain to be calibrated, the compensation filter being disposed upstream or downstream of the first radiofrequency chain to be calibrated and the compensation being carried out on a basis of measurements of a fourth signal observed downstream of the first radiofrequency chain to be calibrated and of the compensation filter, or directly downstream of the first chain to be calibrated;
the dynamic calibration system further comprising:
a device configured for temporal erasure of the injected second calibration signal from an output signal of the first radiofrequency chain, the device having an analogue or digital subtracter, connected downstream of the first radiofrequency chain to be calibrated,
wherein,
the first radiofrequency chain to be calibrated is an analogue chain of a communication receiver comprising a first frequency down-transposition circuit, a first upstream amplification stage disposed upstream of the first transposition circuit, a first downstream amplification stage disposed downstream of the first transposition circuit, and a first output analogue-digital converter, connected at output of the first chain to be calibrated; and
the device for injection of the calibration signal comprises, placed in series, a digital generator of a digital reference calibration signal, a digital-analogue converter, and a second analogue injection chain including an analogue coupler operating as summator of two analogue signals; and
the injection device is configured to inject one or more calibration signals for a temporal sequence covering the useful frequency band on which the first chain is to be calibrated, and to add the one or more calibration signals to the third useful traffic signal; and
the temporal erasure device comprises the digital generator of the digital reference calibration signal shared with the injection device, the digital subtracter, and a third digital chain for providing a replica of the reference calibration signal to be subtracted, adapted in terms of a transposition frequency compatible with the output frequency of the radiofrequency chain to be calibrated and a delay compatible with a propagation time of a signal along a propagation path passing successively through the injection device, the first radiofrequency chain to be calibrated and the compensation filter.

7. The system for dynamic calibration of a radiofrequency circuit of a satellite payload according to claim 6, wherein,
the device for compensation of the frequency and temporal response of the first radiofrequency chain to be calibrated comprises the compensation filter and an adaptive or block-wise optimizer of coefficients of the compensation filter,
the compensation filter being disposed directly downstream of the first radiofrequency chain to be calibrated and directly upstream of the digital subtracter of the temporal erasure device, and
the adaptive optimizer is configured to determine commands for the coefficients of the compensation filter on the basis of measurements of the fourth observed signal which is captured directly downstream of the digital subtracter, and on the basis of the reference calibration signal arising from the digital generator.

8. A system for dynamic calibration of a RF radiofrequency circuit of a satellite payload,
the RF radiofrequency circuit comprising a first radiofrequency chain to be calibrated for amplification and for filtering with or without transposition to a predetermined transposition frequency of a first input signal made up of a temporal sum of a second calibration signal and of a third useful input signal,
the first radiofrequency chain to be calibrated on a useful frequency chain band lying between upstream a first upstream port for receiving the first input signal and downstream a first downstream port for providing a first output signal, the first output signal being a frequency and temporal response of the first radiofrequency chain to be calibrated to the first input signal; and
the dynamic calibration system comprising:
a device for injection of the second calibration signal whose waveform is predetermined upstream of the first radiofrequency chain to be calibrated, the second calibration signal being injected directly in digital form or indirectly in analogue form through a second analogue injection chain on a basis of a reference calibration signal, and the band of the second calibration signal being included in the useful frequency band of the first chain to be calibrated; and
a device for compensation of the frequency and temporal response of the first radiofrequency chain to be calibrated, comprising a filter for compensation on the useful frequency band of the first chain to be calibrated, the compensation filter being disposed upstream or downstream of the first radiofrequency chain to be calibrated and the compensation being carried out on a basis of measurements of a fourth signal observed downstream of the first radiofrequency chain to be calibrated and of the compensation filter, or directly downstream of the first chain to be calibrated;
the dynamic calibration system further comprising:
a device configured for temporal erasure of the injected second calibration signal from an output signal of the first radiofrequency chain, the device having an analogue or digital subtracter, connected downstream of the first radiofrequency chain to be calibrated
wherein,
the first radiofrequency chain to be calibrated is an analogue chain of a communication receiver comprising a first frequency down-transposition circuit, a first upstream amplification stage disposed upstream of the first transposition circuit, a first downstream amplification stage disposed downstream of the first transposition circuit, and a first output analogue-digital converter, connected at output of the first chain to be calibrated; and
the device for injection of the calibration signal comprises, placed in series, a digital generator of a digital reference calibration signal, the digital-analogue converter, and a second analogue injection chain including an analogue coupler operating as summator of two analogue signals; and
the injection device is configured to inject one or more calibration signals for a temporal sequence covering the useful frequency band on which the first chain is calibrated, and to add the one or more calibration signals to the third useful traffic signal; and
the temporal erasure device comprises the digital generator of the digital reference calibration signals of the temporal sequence shared with the injection device, the digital subtracter, and a third digital chain for providing replicas of the reference calibration signals of the sequence to be subtracted, adapted in terms of a transposition frequency compatible with the output frequency of the radiofrequency chain to be calibrated and of gains and delays compatible respectively with gains and propagation times of the one or more calibration signals along the propagation path passing successively through the injection device and the first radiofrequency chain to be calibrated.

9. The system for dynamic calibration of a radiofrequency circuit of a satellite payload according to claim 8, wherein the third digital chain comprises:
a calibration controller, configured to estimate parameters characteristic of the temporal sequence calibration signals on the basis of the fourth observed current signal, and configured to determine parameters characteristic of the replicas adapted to the sequence calibration signals on the basis of the temporal sequence calibration signals generated by the digital generator and estimated parameters; and
the digital generator of the replicas adapted to the one or more calibration signals observed and to be subtracted.

10. The system for dynamic calibration of a radiofrequency circuit of a satellite payload according to claim 8, wherein,
the device for compensation of the frequency and temporal response of the first radiofrequency chain to be calibrated comprises the compensation filter and a drive circuit for the coefficients of the compensation filter,
the compensation filter being connected directly downstream of the digital subtracter, the digital subtracter being disposed directly downstream of the first radiofrequency chain to be calibrated; and
the drive circuit being configured to determine commands for the coefficients of the compensation filter on the basis of several measurements of the fourth observed signal that are captured directly downstream of the first chain to be calibrated and on the basis of the reference calibration signal arising from the digital generator.

11. A system for dynamic calibration of a RF radiofrequency circuit of a satellite payload, the RF radiofrequency circuit comprising a first radiofrequency chain to be calibrated for amplification and for filtering with or without transposition to a predetermined transposition frequency of a first input signal made up of a temporal sum of a second calibration signal and of a third useful input signal, the first radiofrequency chain to be calibrated on a useful frequency chain band lying between upstream a first upstream port for receiving the first input signal and downstream a first downstream port for providing a first output signal, the first output signal being a frequency and temporal response of the first radiofrequency chain to be calibrated to the first input signal; and the dynamic calibration system comprising:
a device for injection of the second calibration signal whose waveform is predetermined upstream of the first radiofrequency chain to be calibrated, the second calibration signal being injected directly in digital form or indirectly in analogue form through a second analogue injection chain on a basis of a reference calibration signal, and the band of the second calibration signal being included in the useful frequency band of the first chain to be calibrated; and
a device for compensation of the frequency and temporal response of the first radiofrequency chain to be calibrated, comprising a filter for compensation on the useful frequency band of the first chain to be calibrated, the compensation filter being disposed upstream or downstream of the first radiofrequency chain to be calibrated and the compensation being carried out on a basis of measurements of a fourth signal observed downstream of the first radiofrequency chain to be calibrated and of the compensation filter, or directly downstream of the first chain to be calibrated;
the dynamic calibration system further comprising:
a device configured for temporal erasure of the injected second calibration signal from an output signal of the first radiofrequency chain, the device having an analogue or digital subtracter, connected downstream of the first radiofrequency chain to be calibrated,
wherein,
the first radiofrequency chain to be calibrated is an analogue chain of a communication transmitter comprising a first frequency up-transposition circuit, a first upstream amplification stage disposed upstream of the first transposition circuit, a first downstream amplification stage disposed downstream of the first transposition circuit, and a first input digital-analogue converter, connected at output of the compensation filter;
the device for injection of the calibration signal comprises, placed in series, a digital generator of a digital reference calibration signal, and a second digital injection chain comprising a digital summator of two digital signals; and
the temporal erasure device comprises the digital generator of the digital reference calibration signal shared with the injection device, the analogue subtracter, and a third digital-analogue hybrid chain for providing a replica of the reference calibration signal to be subtracted, adapted in terms of a transposition frequency compatible with an output frequency of the first radiofrequency chain to be calibrated and a delay compatible with a propagation time of a signal along a propagation path passing successively through the injection device, the compensation filter and the first radiofrequency chain to be calibrated.

12. The system for dynamic calibration of a radiofrequency circuit of a satellite payload according to claim 11, wherein
the third hybrid chain comprises placed in series a third digital sub-chain and a third analogue sub-chain, the third digital sub-chain including in series: a digital circuit for reproduction of a digital reference model of a temporal and the frequency response of the first radiofrequency chain and of the compensation filter of the first chain when the compensation performed by the compensation filter is optimal, and for correction of the amplitude-wise and phase-wise dispersions caused by the third analogue sub-chain, and a third digital-analogue converter; and
the third analogue sub-chain including a third frequency up-transposition circuit, a third upstream amplification stage disposed upstream of the third transposition circuit, a third power amplification downstream stage disposed downstream of the third transposition circuit.

13. The system for dynamic calibration of a radiofrequency circuit of a satellite payload according to claim 12, wherein,
the device for compensation of the frequency and temporal response of the first radiofrequency chain to be calibrated comprises the compensation filter in a digital domain and an adaptive or block-wise optimizer of coefficients of the digital compensation filter,
the compensation filter being disposed directly upstream of the first radiofrequency chain to be calibrated, and directly downstream of the digital summator, and
the adaptive optimizer is configured to determine commands for the coefficients of the compensation filter on the basis of measurements of the fourth observed signal that are captured directly downstream of the analogue subtracter and on the basis of the reference calibration signal arising from the digital generator.

14. The system for dynamic calibration of a radiofrequency circuit of a satellite payload according to claim 13, wherein
the compensation device further comprises a fourth measurement chain for conveying measurements of the fourth observed signal that are captured directly downstream of the analogue subtracter to the adaptive optimizer,
the fourth measurement chain including a fourth frequency down-transposition circuit, a fourth upstream amplification stage disposed upstream of the fourth down-transposition circuit, a fourth downstream amplification stage disposed downstream of the fourth transposition circuit.

* * * * *